(12) United States Patent
Xiong et al.

(10) Patent No.: US 11,006,425 B2
(45) Date of Patent: May 11, 2021

(54) MECHANISMS TO HANDLE DL (DOWNLINK) CONTROL AND DATA CHANNELS WITH DIFFERENT NUMEROLOGIES IN NR (NEW RADIO)

(71) Applicant: Apple Inc., Cupertino, CA (US)

(72) Inventors: Gang Xiong, Portland, OR (US); Yongjun Kwak, Portland, OR (US); Hong He, Sunnyvale, CA (US); Seunghee Han, San Jose, CA (US); Qian Li, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/476,127

(22) PCT Filed: Feb. 2, 2018

(86) PCT No.: PCT/US2018/016661
§ 371 (c)(1),
(2) Date: Jul. 5, 2019

(87) PCT Pub. No.: WO2018/144877
PCT Pub. Date: Aug. 9, 2018

(65) Prior Publication Data
US 2019/0357198 A1 Nov. 21, 2019

Related U.S. Application Data

(60) Provisional application No. 62/454,665, filed on Feb. 3, 2017.

(51) Int. Cl.
*H04W 72/04* (2009.01)
*H04J 4/00* (2006.01)
(Continued)

(52) U.S. Cl.
CPC ............ *H04W 72/048* (2013.01); *H04J 4/00* (2013.01); *H04L 5/0053* (2013.01); *H04L 5/14* (2013.01);
(Continued)

(58) Field of Classification Search
CPC ... H04L 5/0094; H04L 1/0078; H04L 5/0057; H04L 1/0045; H04L 5/0042;
(Continued)

(56) References Cited

U.S. PATENT DOCUMENTS

2017/0094547 A1* 3/2017 Yum .................... H04W 56/001
2017/0332359 A1* 11/2017 Tsai ..................... H04B 7/0639
(Continued)

OTHER PUBLICATIONS

International Preliminary Report on Patentability dated Aug. 16, 2019 for International Application No. PCT/US2018/016661.
(Continued)

*Primary Examiner* — Jung Liu
(74) *Attorney, Agent, or Firm* — Eschweiler & Potashnik, LLC

(57) ABSTRACT

Techniques discussed herein can facilitate handling of DL (Downlink) control and data channels having different numerologies in NR (New Radio). One example embodiment comprises an apparatus employable by a UE (User Equipment) configured to generate a report comprising capability information associated with the UE, wherein the capability information indicates whether the UE supports multiplexing of multiple numerologies within a common symbol in a FDM (Frequency Division Multiplexing)-based manner; process first higher layer signaling that configures one or more control resource sets of a NR (New Radio) PDCCH (Physical Downlink Control Channel), wherein the one or more control resource sets are associated with one or more numerologies in accordance with the UE capability information; and demodulate a NR PDSCH (Physical
(Continued)

Downlink Shared Channel) from a resource distinct from resources of the NR PDCCH.

34 Claims, 14 Drawing Sheets

(51) Int. Cl.
*H04L 5/00* (2006.01)
*H04L 5/14* (2006.01)

(52) U.S. Cl.
CPC ... *H04W 72/0446* (2013.01); *H04W 72/0453* (2013.01)

(58) Field of Classification Search
CPC . H04L 27/2657; H04L 1/004; H04L 27/2656; H04L 27/2662; H04L 1/0009; H04L 27/2666; H04L 1/0041; H04L 1/0057; H04L 5/0035; H04L 5/026; H04L 1/0075; H04L 5/0044; H04L 5/0092; H04L 1/0061; H04L 5/0053; H04L 27/2602; H04L 27/26; H04W 76/11; H04W 56/001; H04W 74/0833; H04W 76/15; H04W 74/008; H04W 68/02; H04W 72/0466; H04W 72/08; H04W 74/006; H04W 84/10; H04W 4/70; H04W 84/18; H04W 72/044; H04W 72/042; H04W 72/12; H04W 72/04; H04W 72/1278
See application file for complete search history.

(56) References Cited

U.S. PATENT DOCUMENTS

| | | | |
|---|---|---|---|
| 2018/0035416 A1* | 2/2018 | Yi | H04W 72/0406 |
| 2018/0054800 A1* | 2/2018 | Yeo | H04W 72/08 |
| 2019/0215812 A1* | 7/2019 | Lyu | H04L 5/0092 |
| 2019/0229879 A1* | 7/2019 | Yi | H04L 5/0082 |
| 2019/0230696 A1* | 7/2019 | Kim | H04L 5/0053 |
| 2020/0099499 A1* | 3/2020 | Yeo | H04W 76/15 |
| 2020/0169375 A1* | 5/2020 | Yi | H04L 5/001 |

OTHER PUBLICATIONS

International Search Report dated Apr. 18, 2018 for International Application No. PCT/US2018/016661.
"Wide Bandwidth Operational Aspects." Source: Samsung. Agenda item: 7.1.1. 3GPP TSG-RAN WG1 Meeting #87, Reno, US, Nov. 14-18, 2016. R1-1612436, 4 pages.
"RRC Support of Multiple Numerologies." Source: Huawei, HiSilicon, Agenda item: 3.2.2.7, 3GPP TSG-RAN WG2 Ad Hoc, Spokane, USA, 17-19, 2017. R2-1700097. 4 pages.
"Discussion on numerology multiplexing." Source: vivo. Agenda Item: 5.1.12. 3GPP TSG RAN WG1 AH_NR Meeting, Spokane, USA, Jan. 16-20, 2017. R1-1700284. 4 pages.
"Consideration on UE capability to process multiple numerologies." Source: Samsung. Agenda item: 8.1.2.1. 3GPP TSG RAN WG1 Meeting #86bis, Lisbon, Portugal, Oct. 10-14, 2016. R1-1609051. 4 pages.

* cited by examiner

ମECHANISMS TO HANDLE DL (DOWNLINK) CONTROL AND DATA CHANNELS WITH DIFFERENT NUMEROLOGIES IN NR (NEW RADIO)

REFERENCE TO RELATED APPLICATIONS

This application is a National Phase entry application of International Patent Application No. PCT/US2018/016661 filed Feb. 2, 2018, which claims priority to U.S. Provisional Application No. 62/454,665 filed Feb. 3, 2017, entitled "DOWNLINK (DL) CONTROL AND DATA CHANNEL WITH DIFFERENT NUMEROLOGIES IN NEW RADIO (NR)" in the name of Gang Xiong et al. and is hereby incorporated by reference in its entirety.

FIELD

The present disclosure relates to wireless technology, and more specifically to techniques employable in connection with a NR (New Radio) DL (Downlink) control and data channels having different numerologies.

BACKGROUND

Mobile communication has evolved significantly from early voice systems to today's highly sophisticated integrated communication platform. The next generation wireless communication system, 5G (Fifth Generation), or new radio (NR), will provide access to information and sharing of data anywhere, anytime by various users and applications. NR is expected to be a unified network/system that can meet vastly different and sometimes conflicting performance dimensions and services. These diverse multi-dimensional targets for NR are driven by different services and applications. In general, NR will evolve based on 3GPP (Third Generation Partnership Project) LTE (Long Term Evolution)-Advanced with additional potential new Radio Access Technologies (RATs) to enrich peoples' lives with better, simpler and seamless wireless connectivity solutions. NR will enable everything connected by wireless and deliver fast, rich contents and services.

DETAILED DESCRIPTION

Figure 1:
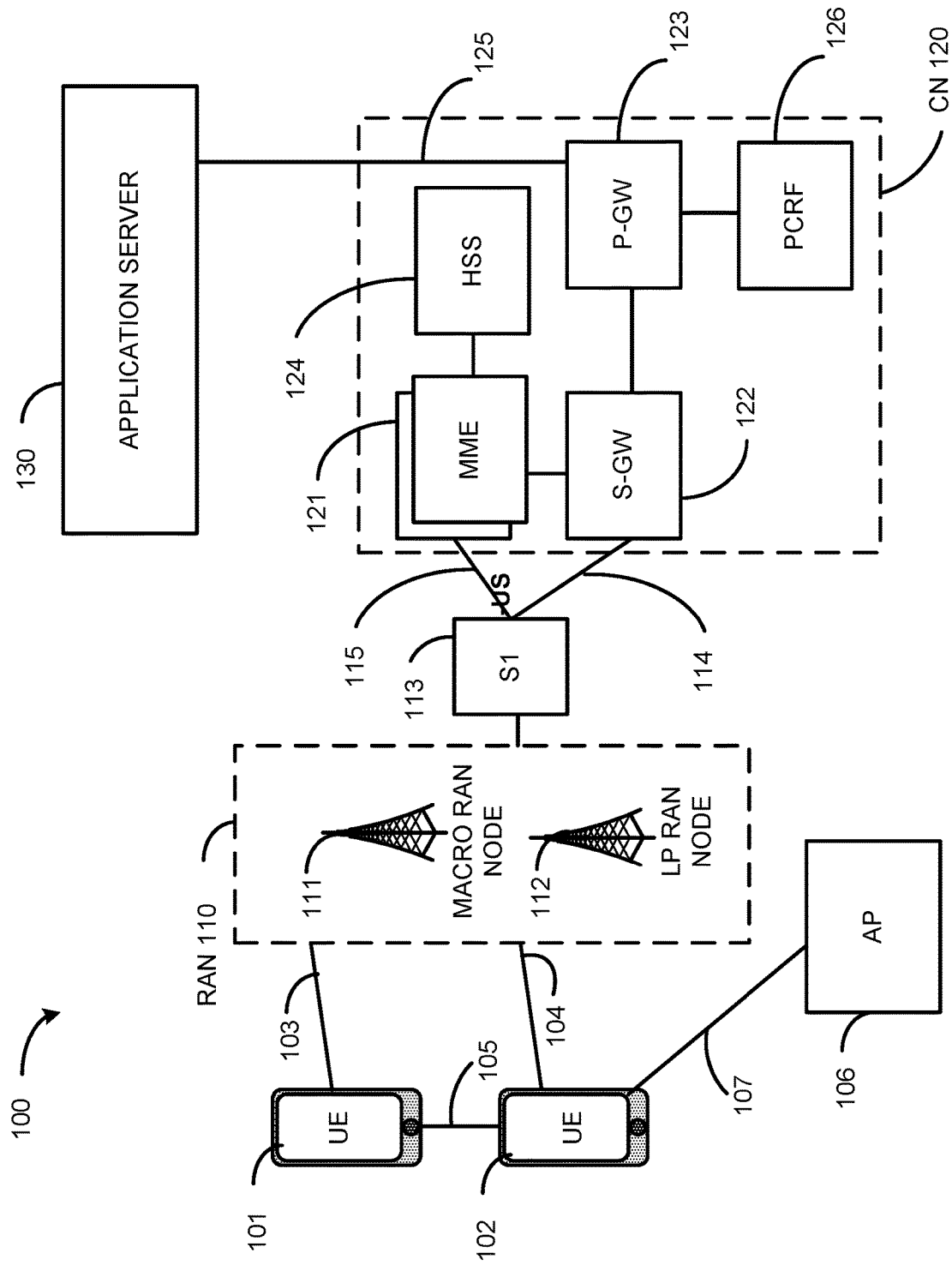
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voiceover-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
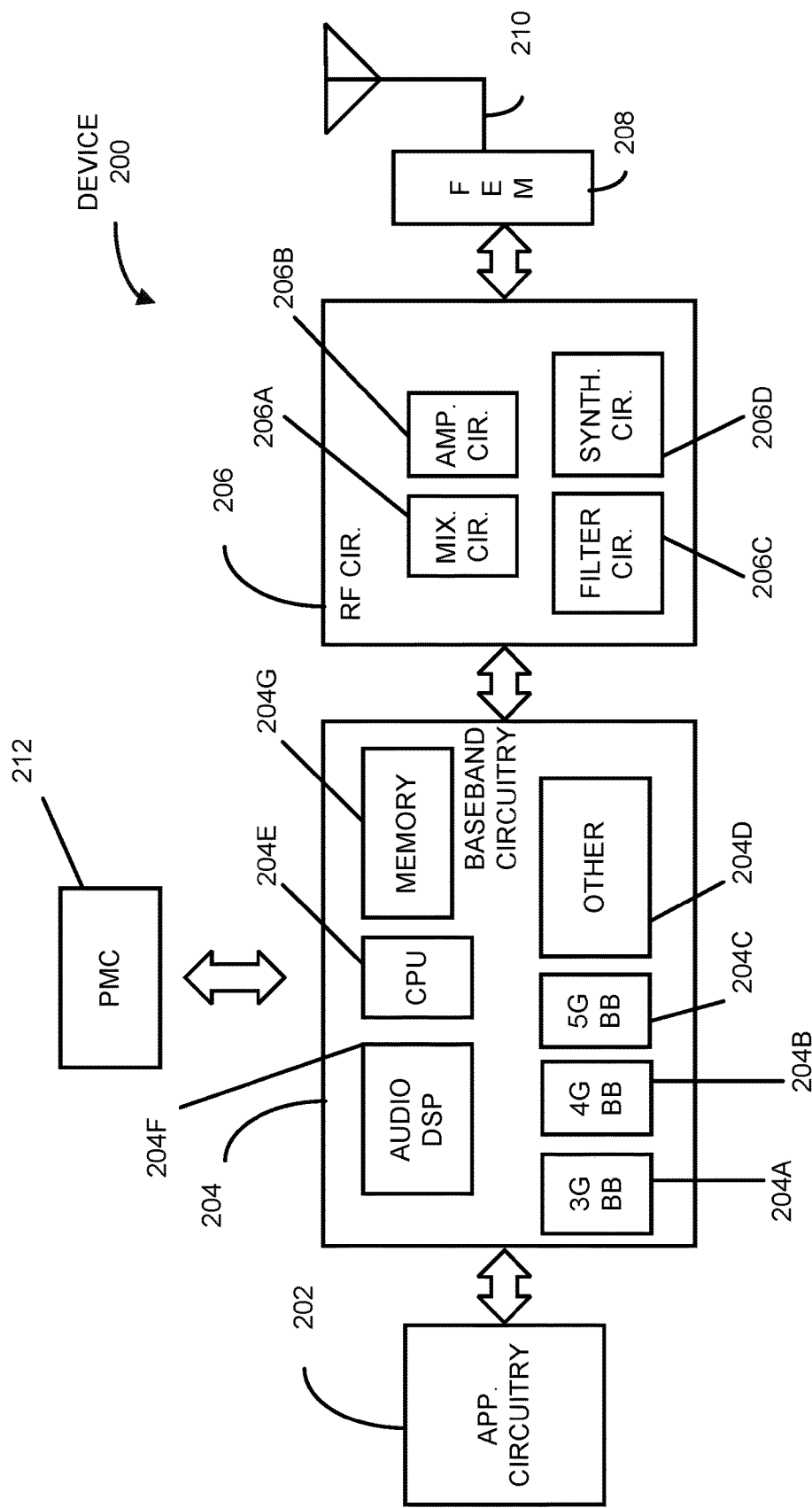
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LAN to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
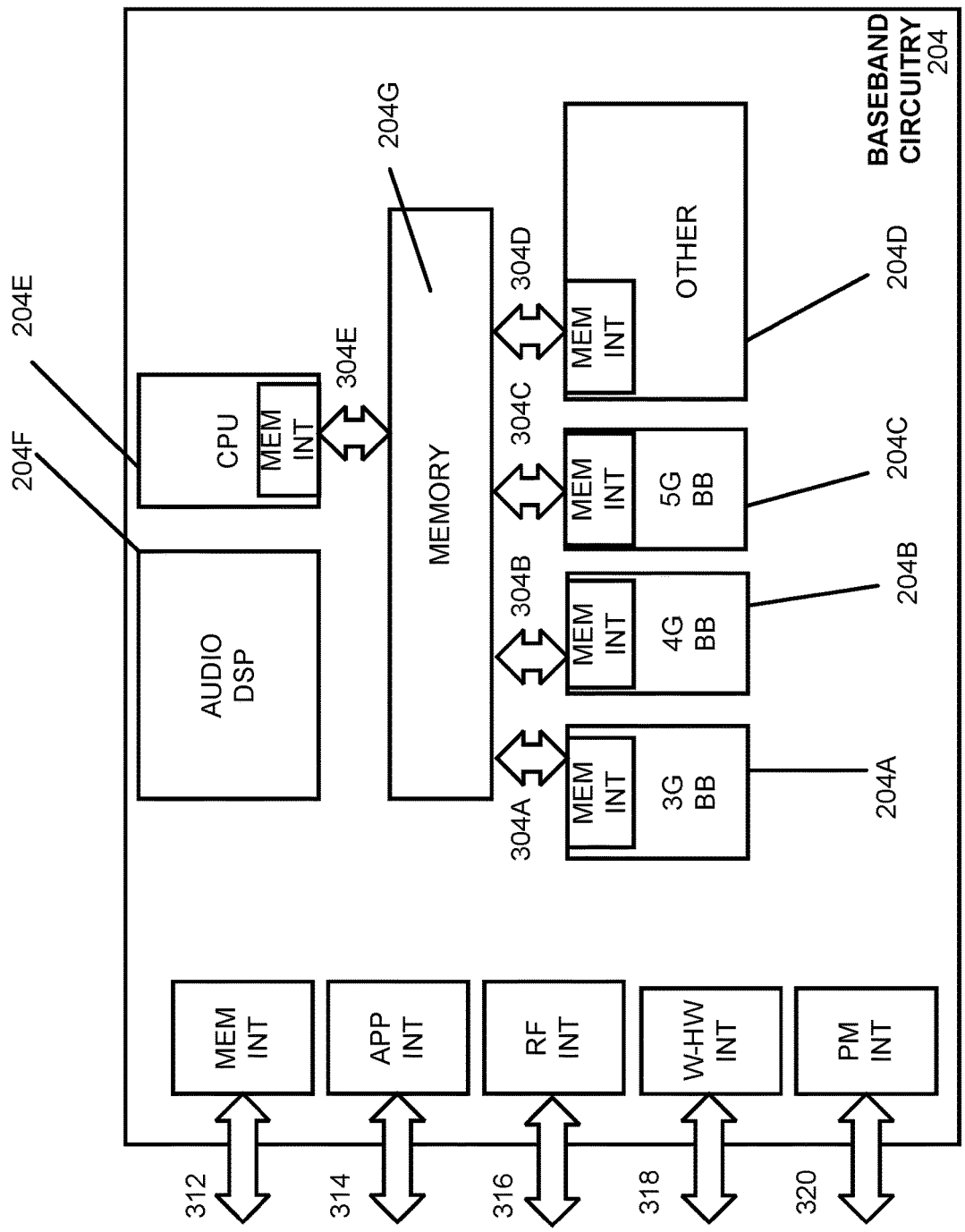
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
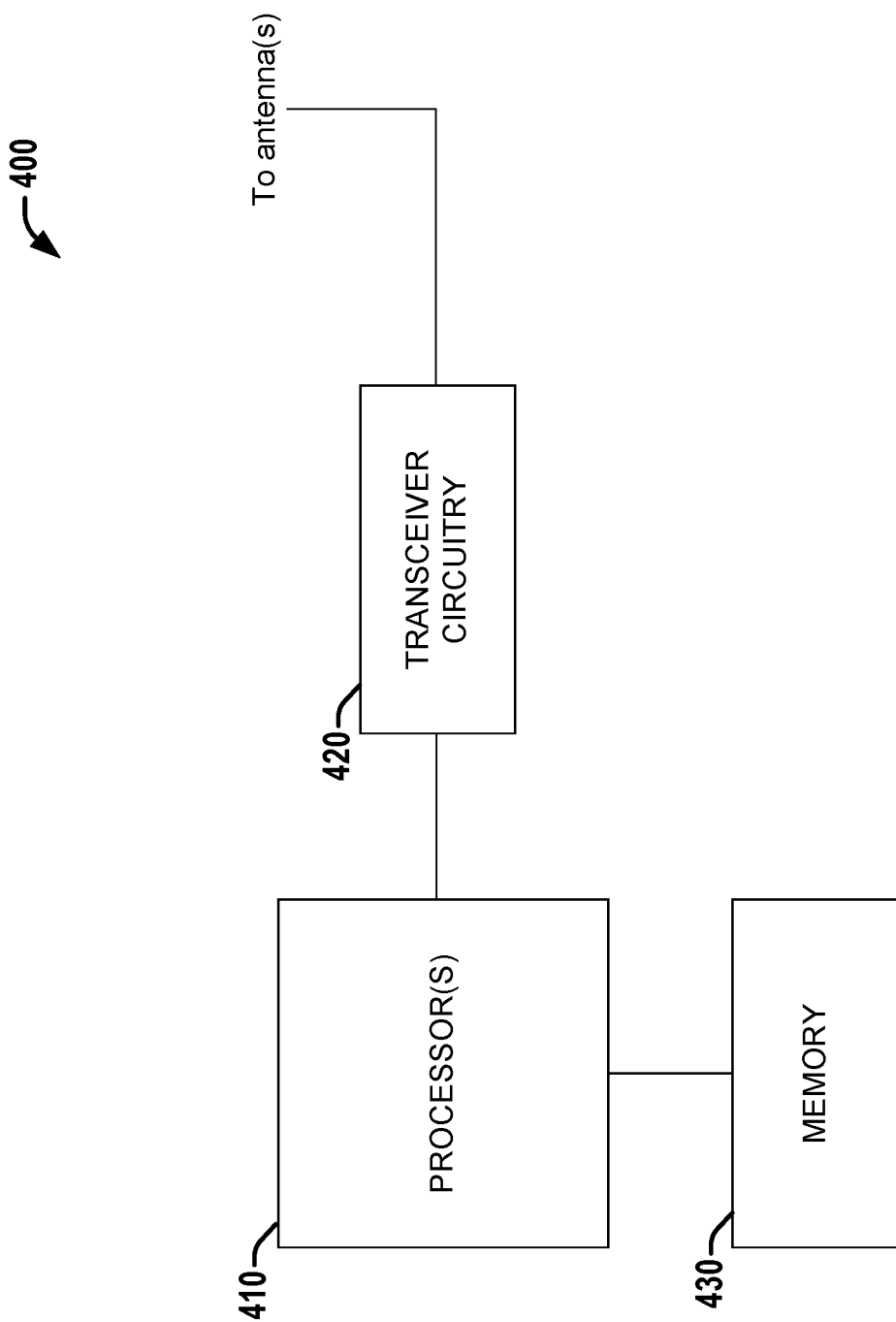
FIG. 4 is a block diagram illustrating a system employable at a UE (User Equipment) that facilitates handling of DL (Downlink) control and data channels having different numerologies, according to various aspects described herein.

Referring to FIG. 4, illustrated is a block diagram of a system 400 employable at a UE (User Equipment) that facilitates handling of DL (Downlink) control and data channels having different numerologies, according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate transmission of capability information indicating whether the UE supports multiplexing of multiple numerologies within a common symbol in a FDM (Frequency Division Multiplexing)-based manner and reception of higher layer signaling configuring control resource sets based on the capability information.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
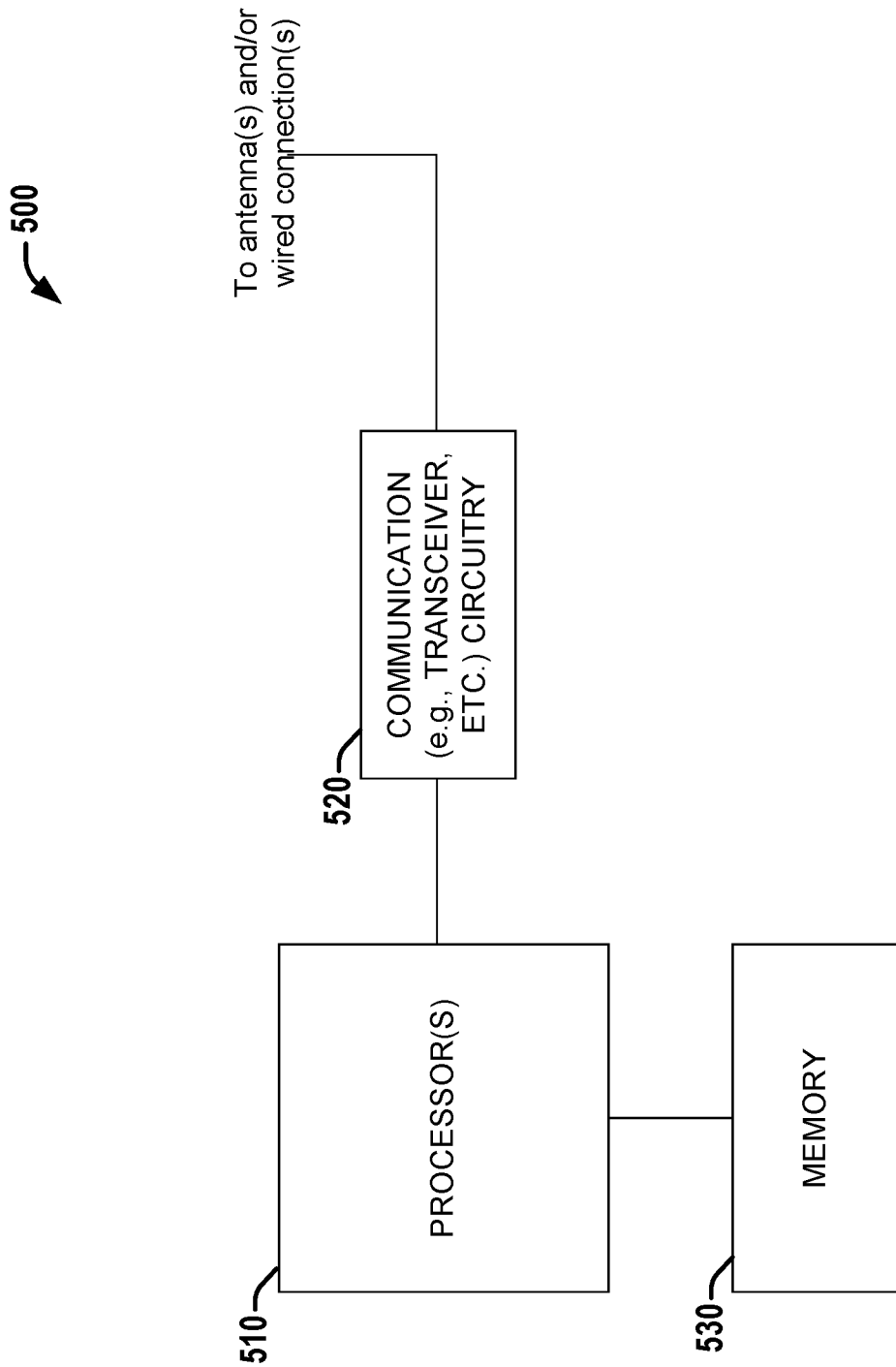
FIG. 5 is a block diagram illustrating a system employable at a BS (Base Station) that facilitates handling of DL control and data channels having different numerologies, according to various aspects described herein.

Referring to FIG. 5, illustrated is a block diagram of a system 500 employable at a BS (Base Station) that facilitates handling of DL control and data channels having different numerologies, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate reception of capability information indicating whether the UE supports multiplexing of multiple numerologies within a common symbol in a FDM (Frequency Division Multiplexing)-based manner and transmission of higher layer signaling configuring control resource sets based on the capability information.

Figure 6:
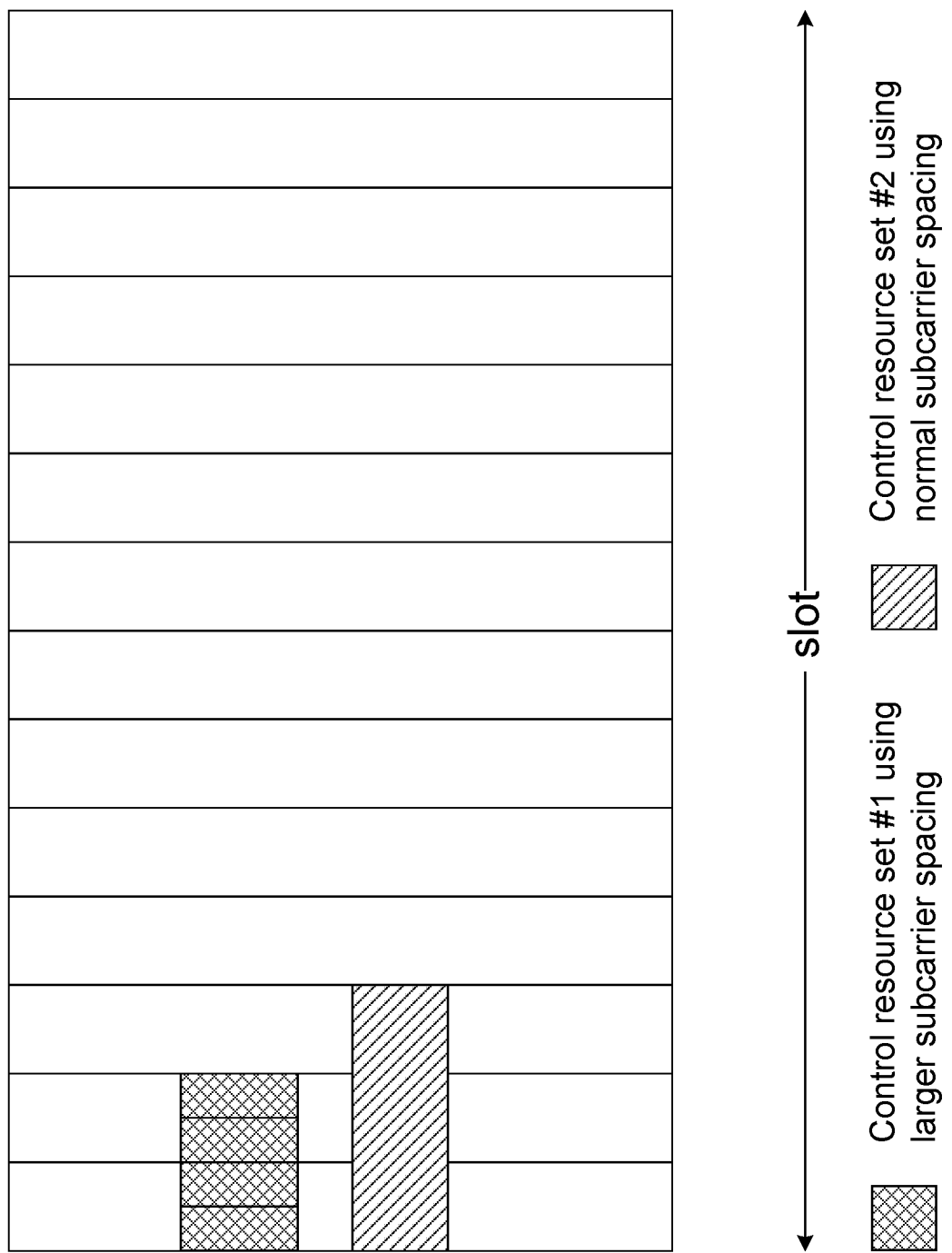
FIG. 6 is a diagram illustrating an example of two control resource sets with different subcarrier spacings configured for a single UE, according to various aspects discussed herein.

At the RAN1 (RAN (Radio Access Network) WG1 (Working Group 1)) #87 meeting, the following agreements were made with regard to dynamic reuse of control resource for DL data transmission:

NR should support dynamic reuse of at least part of resources in the control resource sets for data for the same or a different UE, at least in the frequency domain FFS [For Further Study] if resource reuse can be done in time domain as well FFS: DL data DM [Demodulation]-RS [Reference Signal] location in time should not vary dynamically as a consequence of dynamic reuse of control resources for data FFS: time/frequency granularity of the resource reuse FFS: signaling needed, if any Further, regarding the control resource set, the following agreements were reached:

A control resource set is, in the frequency domain, a set of PRBs [Physical Resource Blocks] within which the UE attempts to blindly decode downlink control information A control resource set is defined as a set of REGs [Resource Element Groups] under a given numerology As discussed above, one control resource set can be associated with one numerology. In scenarios wherein a UE (e.g., employing system 400) is configured with multiple control resource sets (e.g., via higher layer signaling generated by processor(s) 510, transmitted via communication circuitry 520, received via transceiver circuitry 420, and processed by processor(s) 410), different control resource sets can be configured with different numerologies (e.g., via higher layer signaling generated by processor(s) 510, transmitted via communication circuitry 520, received via transceiver circuitry 420, and processed by processor(s) 410). Referring to FIG. 6, illustrated is a diagram showing an example of two control resource sets with different subcarrier spacings configured for a single UE, according to various aspects discussed herein. As can be seen in the example of FIG. 6, there are scenarios wherein a UE monitors (e.g., via processor(s) 410 and transceiver circuitry 420) multiple control resource sets (e.g., received via transceiver circuitry 420) with different numerologies in the same symbol, which can be undesirable in terms of receiver complexity. To address this issue, mechanisms discussed herein can be employed (e.g., by systems 400 and/or 500) to allow a UE to monitor (e.g., via processor(s) 410 and transceiver circuitry 420) control resource sets with different numerologies.

Figure 7:
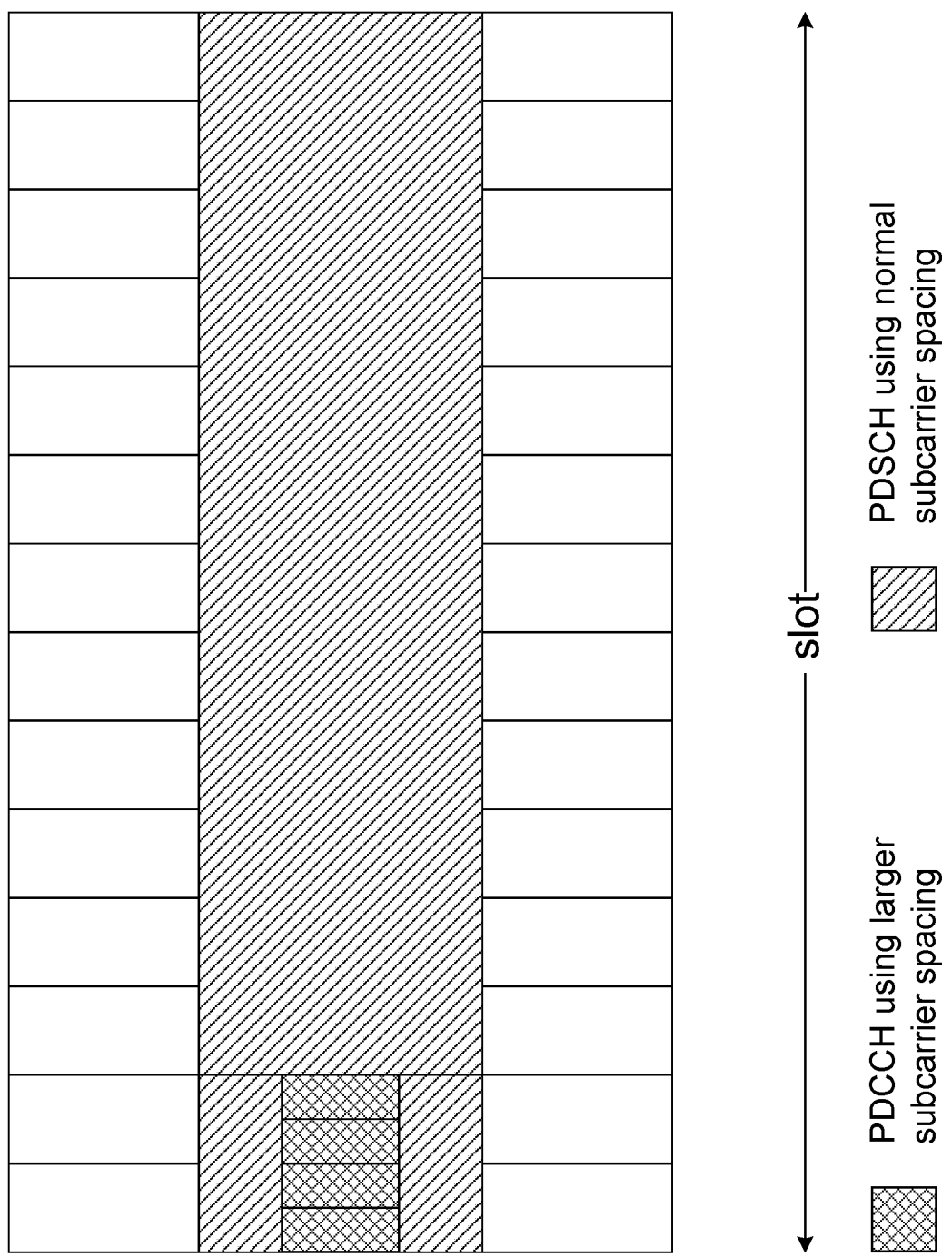
FIG. 7 is a diagram illustrating an example scenario involving cross numerology scheduling wherein different numerologies can be applied for a DL control channel and an associated DL data channel, for dynamic reuse of the control resource for data transmission, according to various aspects discussed herein.

Additionally, it has been agreed that NR should support dynamic reuse of at least part of the resources in the control resource sets for data for the same or a different UE in both the time and frequency domains. Referring to FIG. 7, illustrated is a diagram showing an example scenario involving cross numerology scheduling wherein different numerologies can be applied for a DL control channel and an associated DL data channel, for dynamic reuse of the control resource for data transmission, according to various aspects discussed herein. In such scenarios, the UE can decode (e.g., via processor(s) 410) DL control (e.g., NR PDCCH (Physical Downlink Control Channel)) and data (e.g., NR PDCCH (Physical Downlink Control Channel)) using different numerologies in the same symbol (e.g., received via transceiver circuitry 420), which can be undesirable in terms of receiver complexity. To address this issue, mechanisms discussed herein can be employed (e.g., by systems 400 and/or 500) to facilitate dynamic reuse of control resource(s) for data transmission in scenarios involving cross-numerology scheduling.

In various aspects discussed herein, mechanisms are discussed to address scenarios involving DL control and data channels having different numerologies in NR. These mechanisms can comprise: (1) mechanisms to handle control resource sets with different numerologies and (2) mechanisms for dynamic reuse of control resource(s) for data transmission in scenarios involving cross-numerology scheduling.

Mechanisms to Handle Control Resource Sets with Different Numerologies

As discussed above, in scenarios wherein a UE is configured with multiple control resource sets with different numerologies, depending on UE capability, the UE may not be able to decode the NR physical downlink control channel (NR PDCCH) using different numerologies. To address this issue, in various embodiments, one or more of the following aspects can be employed for handling control resource sets with different numerologies:

In various aspects, when generating a UE CAPABILITY INFORMATION message and transferring that information to a BS such as a gNB (e.g., via a UE capability information report generated by processor(s) 410, transmitted via transceiver circuitry 420, received via communication circuitry 520, and processed by processor(s) 510), the UE can include (e.g., in the UE capability information report) at least one field indicating whether the UE supports multiplexing of multiple numerologies in a frequency division multiplexing (FDM)-based manner in the same symbol.

In various such aspects, before the UE informs the BS of its capability of supporting FDM based multiplexing of multiple numerologies in the same symbol (e.g., via a UE capability information report generated by processor(s) 410, transmitted via transceiver circuitry 420, received via communication circuitry 520, and processed by processor(s) 510), the BS can configure (e.g., via higher layer signaling generated by processor(s) 510, transmitted via communication circuitry 520, received via transceiver circuitry 420, and processed by processor(s) 410) that same numerology to be applied for all control resource sets for that UE. Given that one control resource set with common or group common search space can be configured by NR MSI (Minimum System Information), NR RMSI (Remaining Minimum System Information), or NR OSI (Other System Information) (e.g., generated by processor(s) 510, transmitted via communication circuitry 520, received via transceiver circuitry 420, and processed by processor(s) 410), this can be done by applying the same numerology for control resource set with common/group common search space and UE specific search space (e.g., via processor(s) 510 and communication circuitry 520).

In various aspects, in scenarios wherein the UE does not support FDM-based multiplexing of multiple numerologies in the same symbol, after receiving UE capability information (e.g., generated by processor(s) 410, transmitted via transceiver circuitry 420, received via communication circuitry 520, and processed by processor(s) 510), the BS can configure the same numerology for multiple control resource sets (e.g., via higher layer signaling generated by processor(s) 410, transmitted via transceiver circuitry 420, received via communication circuitry 520, and processed by processor(s) 510).

Figure 8:
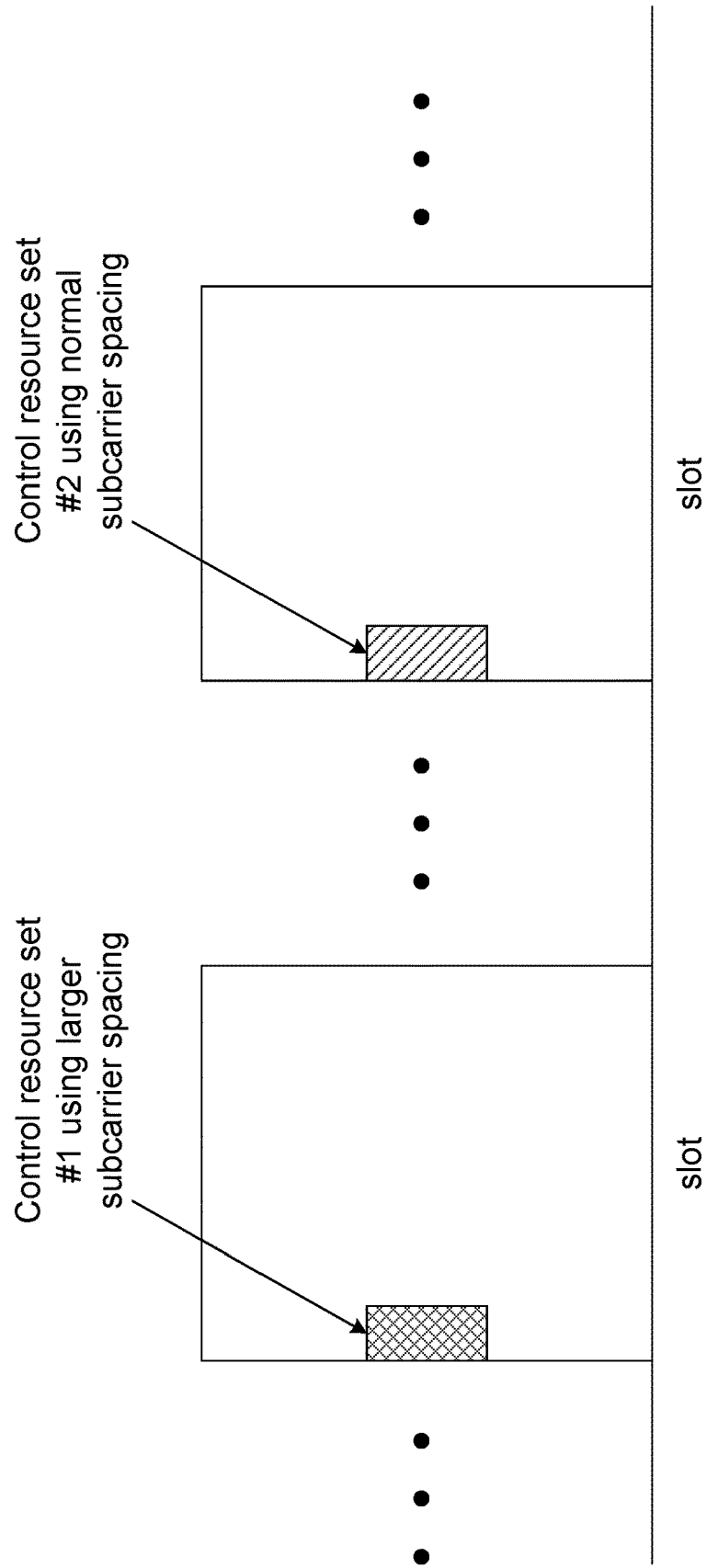
FIG. 8 is a diagram illustrating an example of multiplexing of control resource sets with different numerologies in a TDM (Time Division Multiplexing)-based manner in different slots, according to various aspects discussed herein.

Alternatively, in scenarios wherein the UE does not support FDM-based multiplexing of multiple numerologies in the same symbol, in various aspects, the BS can configure multiple control resource sets with different numerologies in a time division multiplexing (TDM) manner in different symbols or slots (e.g., via higher layer signaling generated by processor(s) 410, transmitted via transceiver circuitry 420, received via communication circuitry 520, and processed by processor(s) 510). In various such aspects, one or more control resource sets with the same numerology can be configured within the same symbol or slot (e.g., via higher layer signaling generated by processor(s) 410, transmitted via transceiver circuitry 420, received via communication circuitry 520, and processed by processor(s) 510), which can allow the UE to decode (e.g., via processor(s) 410) NR PDCCH in the same or different control resource sets (e.g., received via transceiver circuitry 420). Additionally, in aspects, the BS can configure (e.g., via higher layer signaling generated by processor(s) 410, transmitted via transceiver circuitry 420, received via communication circuitry 520, and processed by processor(s) 510) different periodicities and/or slot offsets for control resource sets using different numerologies. Referring to FIG. 8, illustrated is a diagram showing one example of multiplexing of control resource sets with different numerologies in a TDM-based manner in different slots, according to various aspects discussed herein.

In various aspects, in scenarios wherein a UE does not support FDM-based multiplexing of multiple numerologies in the same symbol, and wherein the BS configures multiple control resource sets with different numerologies in the same symbol or slot (e.g., via higher layer signaling generated by processor(s) 410, transmitted via transceiver circuitry 420, received via communication circuitry 520, and processed by processor(s) 510), one or more priority rules or dropping rules can be defined and employed by the UE (e.g., by processor(s) 410) to allow the UE to skip decoding (e.g., via processor(s) 410) of PDCCH in one or more control resource sets associated with at least one numerology. In various such aspects, priority rule(s) and/or dropping rule(s) can be predefined in the specification or configured by higher layers via NR MSI (Minimum System Information), NR RMSI (Remaining Minimum System Information), NR OSI (Other System Information), or RRC (Radio Resource Control) signaling (e.g., generated by processor(s) 510, transmitted via communication circuitry 520, received via transceiver circuitry 420, and processed by processor(s) 410). In one such example, a control resource set with common or group common search space can be defined to have a highest priority.

In another example, in which a UE is configured (e.g., via higher layer signaling generated by processor(s) 510, transmitted via communication circuitry 520, received via transceiver circuitry 420, and processed by processor(s) 410) with two control resource sets (e.g., using 15 kHz and 30 kHz subcarrier spacing, respectively) and the BS indicates that one such set (e.g., the 15 kHz) has higher priority than another such set (e.g., the 30 kHz), and the two control resource sets are multiplexed (e.g., by processor(s) 510 and communication circuitry 520) in a FDM manner in the same symbol, the UE can perform (e.g., via processor(s) 410) blind decoding for NR PDCCH in the indicated control resource set (e.g., the one using 15 kHz subcarrier spacing).

In various aspects, in scenarios wherein the UE supports FDM-based multiplexing of multiple numerologies in the same symbol, a guard band can be inserted (e.g., by processor(s) 510 and communication circuitry 520) between control resource sets. In such aspects, the guard bands can be applied to ensure that control resource sets using different numerologies do not overlap in the frequency domain.

Figure 9:
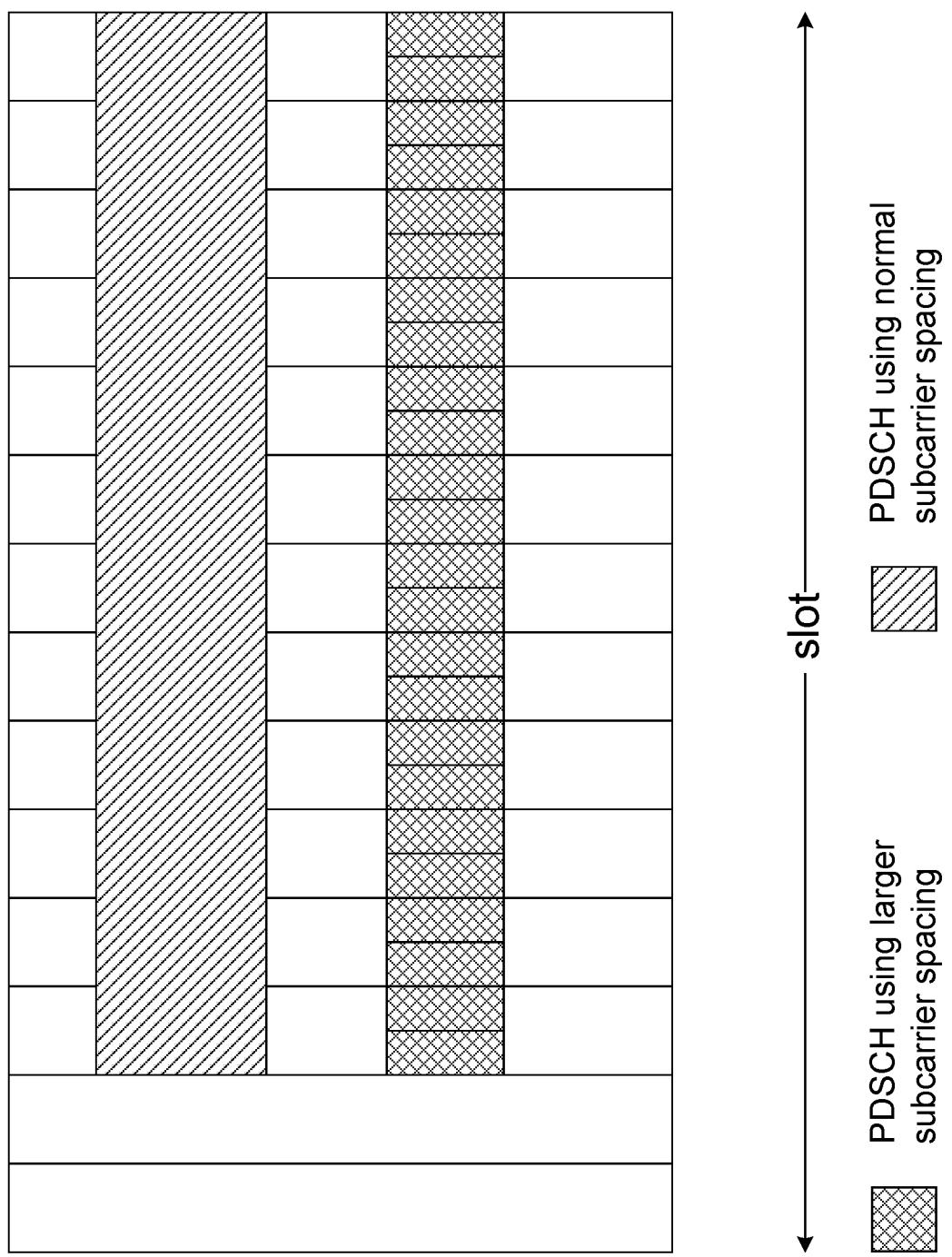
FIG. 9 is a diagram illustrating an example scenario wherein multiple PDSCHs (Physical Downlink Shared Channels) with different numerologies are transmitted within the same system bandwidth in a FDM (Frequency Division Multiplexing)-based manner for one UE, according to various aspects discussed herein.

Additionally or alternatively, aspects discussed herein can be applied in scenarios wherein a UE is scheduled with multiple PDSCHs with different numerologies. Referring to FIG. 9, illustrated is a diagram showing an example scenario wherein multiple PDSCHs with different numerologies are transmitted within the same system bandwidth in a FDM manner for one UE, according to various aspects discussed herein. Depending on the UE capability, the UE can skip decoding (e.g., via processor(s) 410) one or more of these PDSCHs, which can be determined by priority and/or dropping rule(s) as discussed herein.

In NR, a group common PDCCH can be employed to carry some critical information, such as information related to slot type and potential control resource set size. Indicating potential control resource set size can reduce the number of blind decoding attempts (e.g., by processor(s) 410 and transceiver circuitry 420) and can save power consumption at the UE side. Given that different numerologies can be defined for different control resource sets, the value(s) for control resource size(s) can be aligned (e.g., by processor(s) 410) by using a single numerology. For example, the value for control resource size can be defined in accordance with (a) the numerology predefined in the specification (depending on carrier frequency); (b) the numerology associated with one of the synchronization signals, NR physical broadcast signal (NR PBCH) or RMSI or OSI transmission; or (c) the numerology associated with a control resource set for a common/group common search space.

To further reduce the blind decoding attempts for NR PDCCH and thereby reduce UE power consumption, the search space configuration or reconfiguration can be indicated in the medium access control (MAC) control element (CE) or via RRC signaling (e.g., generated by processor(s) 510, transmitted via communication circuitry 520, received via transceiver circuitry 420, and processed by processor(s) 410). In one example, one potential approach is to configure a subset of aggregation levels that the UE can monitor for DL control channel decoding (e.g., via higher layer signaling generated by processor(s) 510, transmitted via communication circuitry 520, received via transceiver circuitry 420, and processed by processor(s) 410).

Mechanisms for Dynamic Reuse of Control Resource(s) for Data Transmission in Case of Cross-Numerology Scheduling As discussed above, in scenarios involving cross numerology scheduling wherein different numerologies are applied (e.g., by processor(s) 510 and communication circuitry 520) for DL control (e.g., NR PDCCH (Physical Downlink Control Channel)) and associated DL data (e.g., NR PDSCH (Physical Downlink Shared Channel)) for dynamic reuse of control resource for data transmission, this can result in the UE decoding (e.g., via processor(s) 410) DL control and data using different numerologies in the same symbol, which can be undesirable in terms of receiver complexity. To address this issue, in various embodiments, dynamic reuse of control resource(s) for data transmission in scenarios involving cross-numerology scheduling can be performed according to one or more of the following aspects:

In various aspects, similarly to aspects discussed above involving control resource sets with different numerologies, the UE can report UE capability information indicating whether the UE supports FDM-based multiplexing of different numerologies in the same symbol (e.g., via a UE capability information report generated by processor(s) 410, transmitted via transceiver circuitry 420, received via communication circuitry 520, and processed by processor(s) 510). In scenarios wherein the UE does not support such FDM-based multiplexing, the BS (e.g., gNB, etc.) can avoid (e.g., via processor(s) 510) dynamic resource sharing of control and data in the same symbol in scenarios involving cross-numerology scheduling. Thus, in such scenarios, dynamic reuse of at least some parts of control resource set(s) for data transmission can be disabled.

Figure 10:
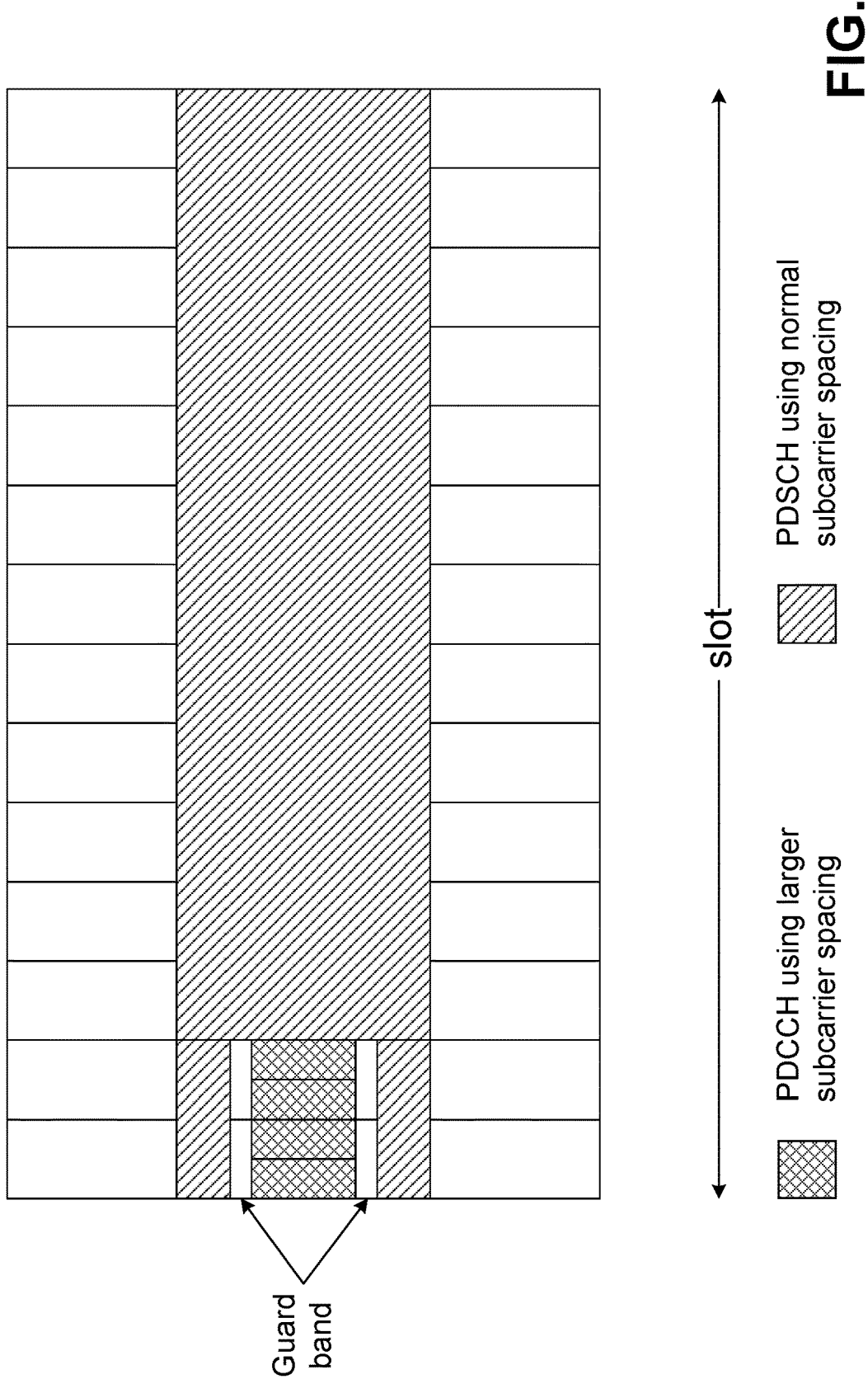
FIG. 10 is a diagram illustrating an example of a scenario involving a guard band inserted between DL control and data transmission having different numerologies, according to various aspects discussed herein.

In various aspects, in scenarios wherein the UE supports FDM-based multiplexing of different numerologies in the same symbol, a guard band can be inserted (e.g., by processor(s) 510 and communication circuitry 520) between DL control (e.g., NR PDCCH) and data (e.g., NR PDSCH) transmission with different numerologies. Referring to FIG. 10, illustrated is a diagram showing an example of a scenario involving a guard band inserted between DL control and data transmission having different numerologies, according to various aspects discussed herein. In various such aspects, the guard band can be predefined in the specification, or can be configured by higher layer signaling (e.g., generated by processor(s) 510, transmitted via communication circuitry 520, received via transceiver circuitry 420, and processed by processor(s) 410).

Figure 11:
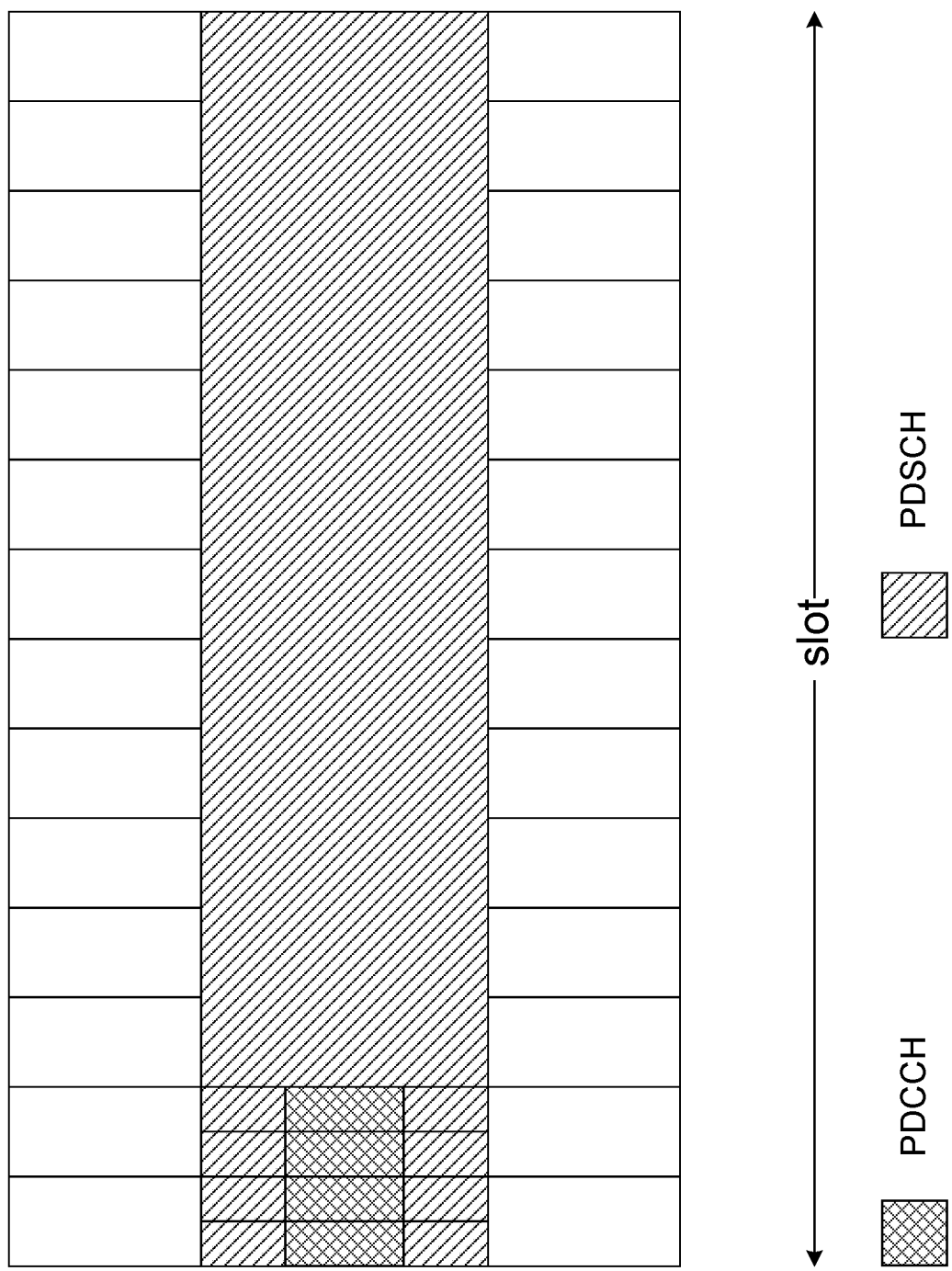
FIG. 11 is a diagram illustrating an example wherein the BS employs different numerologies for the transmission of PDSCH in the first 2 symbols (where a control resource set is allocated) and the remaining symbols within the same slot, according to various aspects discussed herein.

In various aspects, in scenarios wherein a UE does not support FDM-based multiplexing of different numerologies in the same symbol, and for cross-numerology scheduling, the same numerology can be employed (e.g., by processor(s) 510 and communication circuitry 520) for PDSCH as for PDCCH in the symbols where a control resource set is configured in case of dynamic resource sharing of PDCCH and PDSCH. Referring to FIG. 11, illustrated is a diagram showing an example wherein the BS (e.g., gNB) employs different numerologies for the transmission of PDSCH in the first 2 symbols (where a control resource set is allocated) and the remaining symbols within the same slot, according to various aspects discussed herein. In such aspects, the same numerology can be applied (e.g., by processor(s) 510 and communication circuitry 520) for PDSCH and PDCCH in symbols wherein both PDSCH and PDCCH (e.g., generated by processor(s) 510) are transmitted (e.g., by communication circuitry 520).

In various aspects, a group common PDCCH (e.g., generated by processor(s) 510, transmitted via communication circuitry 520, received via transceiver circuitry 420, and processed by processor(s) 410) can be employed to carry some critical information, such as information related to slot type and potential control resource set size(s). In scenarios wherein the control resource set size or the number of symbols for control resource size is indicated in the group common PDCCH, for dynamic resource sharing between control and data channels (e.g., NR PDCCH and NR PDSCH), the data channel (e.g., PDSCH) can be rate matched around or can puncture the resource from the control resource set (e.g., as generated/scheduled by processor(s) 510 and transmitted by communication circuitry 520), in accordance with the control resource size indicated in the group common PDCCH.

Alternatively, in various aspects, because the UE might not receive the group common PDCCH, it can be beneficial for the UE to assume (e.g., via processor(s) 410) the DL data transmission to be rate matched around or puncturing the resource from the control resource set, in accordance with the size configured by higher layers (e.g., generated by processor(s) 510, transmitted via communication circuitry 520, received via transceiver circuitry 420, and processed by processor(s) 410).

Figure 12:
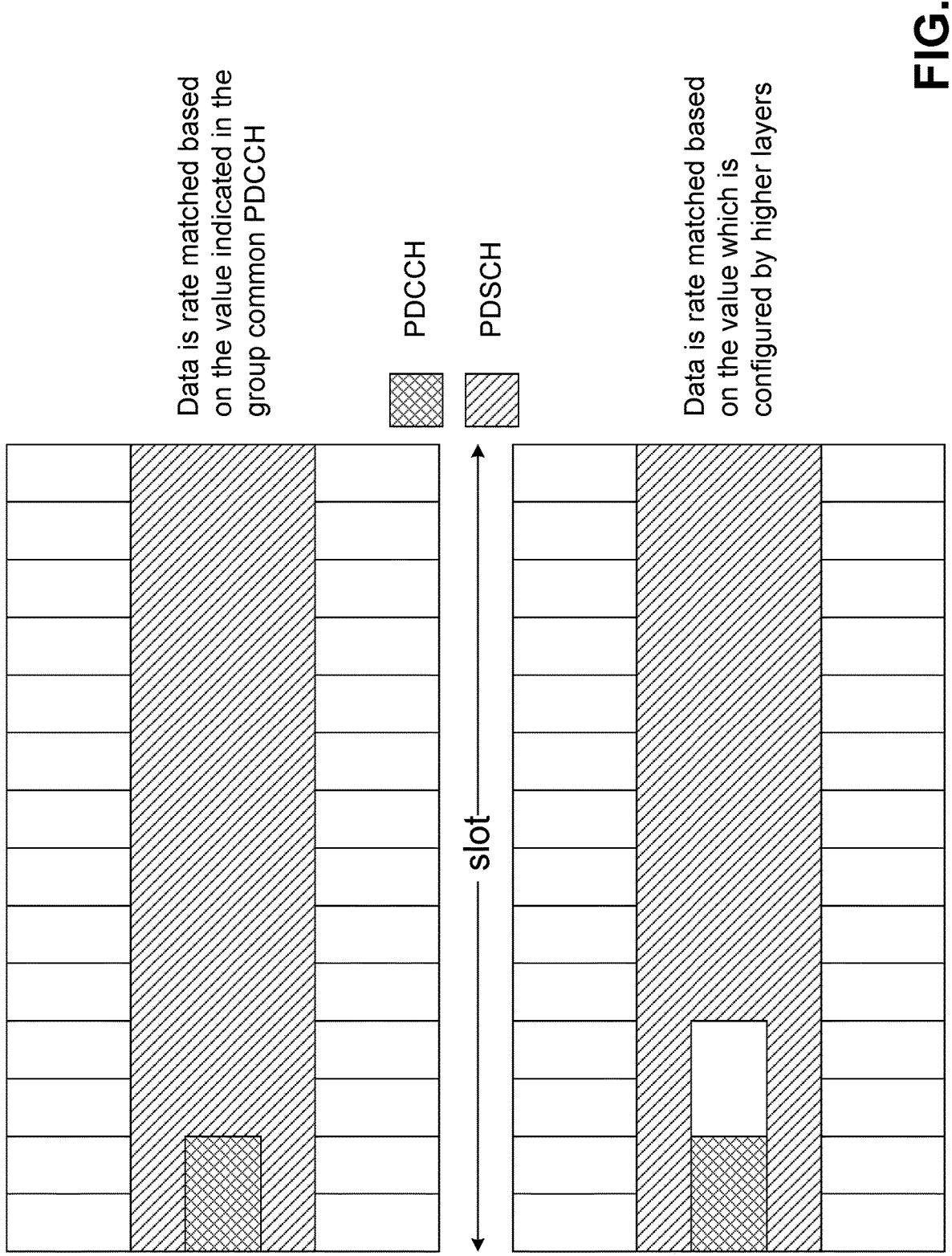
FIG. 12 is a pair of diagrams illustrating example scenarios involving dynamic resource sharing between control and data transmission based on indication of control resource set size via group common PDCCH (Physical Downlink Control Channel) in the top diagram or configured by higher layers in the bottom diagram, according to various aspects discussed herein.

Referring to FIG. 12, illustrated is a pair of diagrams showing example scenarios involving dynamic resource sharing between control and data transmission based on indication of control resource set size via group common PDCCH in the top diagram or configured by higher layers in the bottom diagram, according to various aspects discussed herein. In various aspects, three potential techniques can be employed for scenarios involving dynamic indication of control resource set size. In the example of FIG. 12, the control resource set size can be configured as 4 symbols (e.g., via higher layer signaling generated by processor(s) 510, transmitted via communication circuitry 520, received via transceiver circuitry 420, and processed by processor(s) 410), and the control resource set size indicated in the group common PDCCH can be 2 symbols (which can indicate that the UE does not need to decode the PDCCH in the third and fourth symbols). According to a first technique, data (e.g., PDSCH) transmission can be rate matched (e.g., by processor(s) 510 and communication circuitry 520) around the resource from the control resource set with 2 symbol duration (indicated with cross-hatching), which can be based on the value from the group common PDCCH, as shown in the top diagram of FIG. 12. According to a second technique, shown in the bottom diagram of FIG. 12, data transmission can be rate matched (e.g., by processor(s) 510 and communication circuitry 520) around the resource from the control resource set with 4 symbol duration, which can be based on the value from high layer configuration (e.g., via higher layer signaling generated by processor(s) 510, transmitted via communication circuitry 520, received via transceiver circuitry 420, and processed by processor(s) 410). The white region (the region without hatching) can indicate resources that can be unused in the second technique. According to a third technique, data can be rate matched around the resource from the control resource set with 4 symbol duration, similar to the second technique. Additionally, in the third technique, the remaining white resources (the region without hatching) shown in the bottom diagram of FIG. 12 can be filled with additional parity bits from the channel encoder (e.g., by processor(s) 510 and communication circuitry 520) and the BS (e.g., gNB) can transmit all data (e.g., PDSCH) in the resources of the white region and the PDSCH region. In various aspects, the third technique can be applied in scenarios wherein the UE receives common PDCCH, as well as in scenarios wherein the UE does not or cannot receive common PDCCH.

Additional Embodiments

Figure 13:
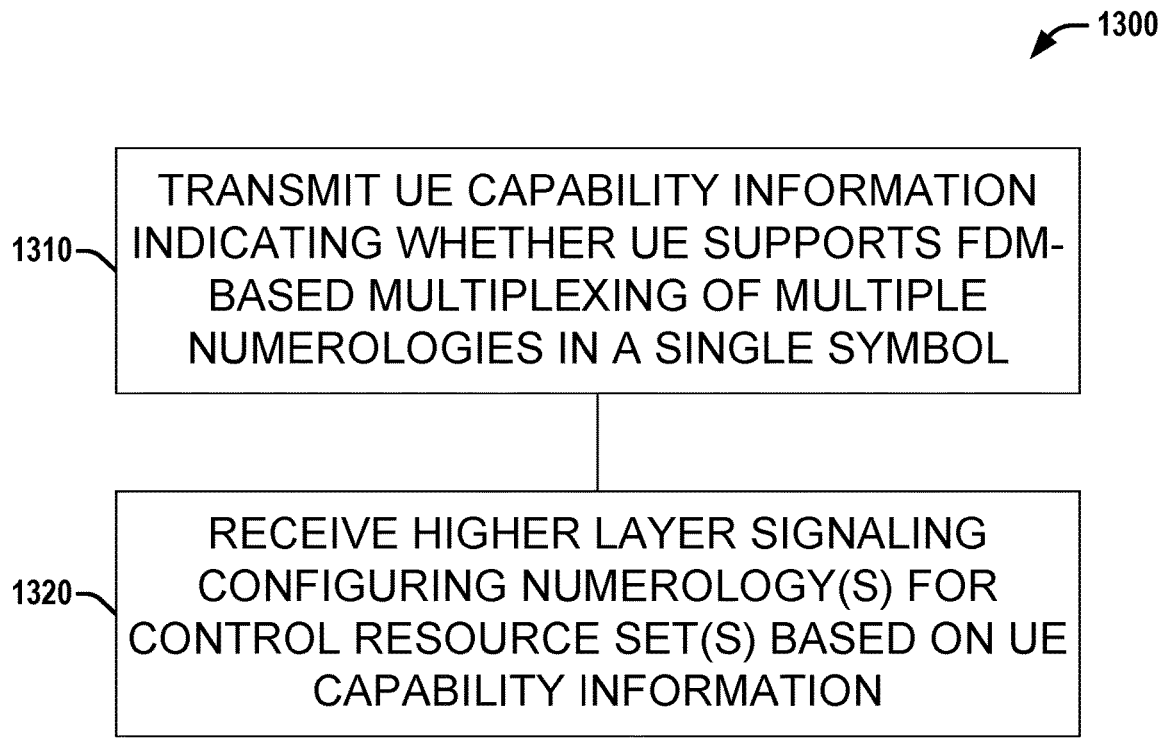
FIG. 13 is a flow diagram of an example method employable at a UE that facilitates handling of DL control and data channels having different numerologies, according to various aspects discussed herein.

Referring to FIG. 13, illustrated is a flow diagram of an example method 1300 employable at a UE that facilitates handling of DL control and data channels having different numerologies, according to various aspects discussed herein. In other aspects, a machine readable medium can store instructions associated with method 1300 that, when executed, can cause a UE to perform the acts of method 1300.

At 1310, UE capability information can be transmitted that indicates whether the UE supports FDM-based multiplexing of multiple numerologies in a single symbol.

At 1320, higher layer signaling can be received that configures one or more control resource sets with the same or different numerologies based on the UE capability information.

Additionally or alternatively, method 1300 can include one or more other acts described herein in connection with receiving entity aspects of system 400.

Figure 14:
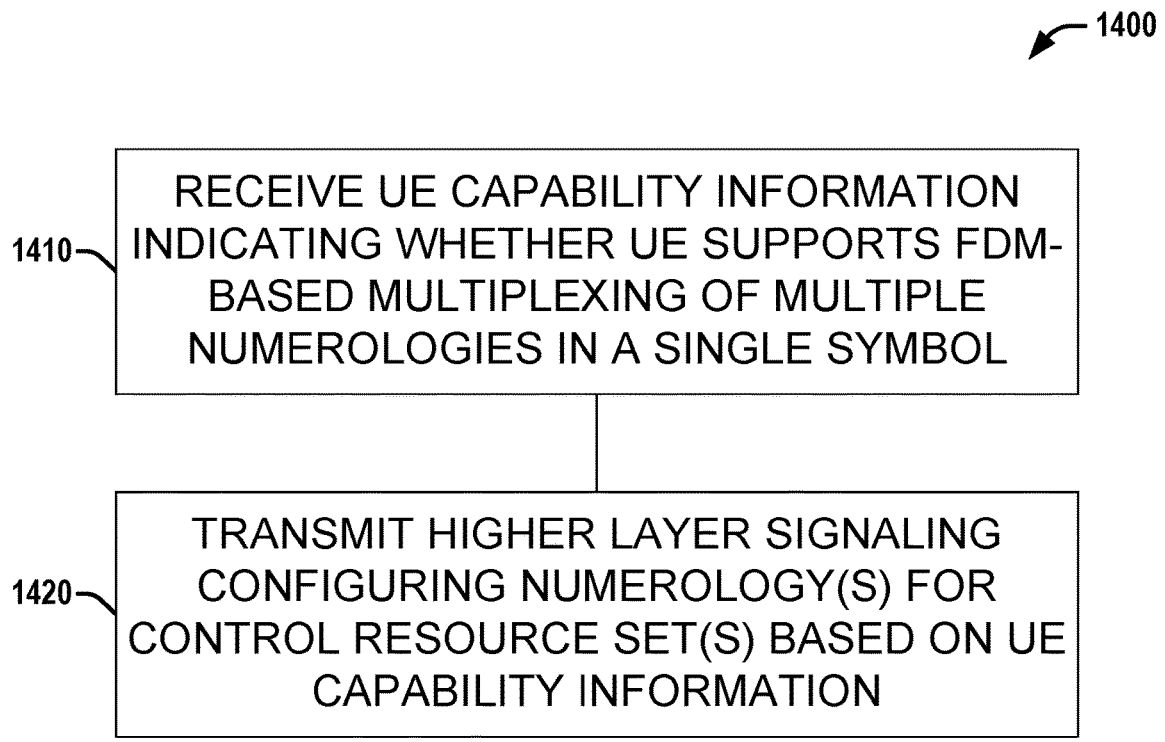
FIG. 14 is a flow diagram of an example method employable at a BS that facilitates handling of DL control and data channels having different numerologies, according to various aspects discussed herein.

Referring to FIG. 14, illustrated is a flow diagram of an example method 1400 employable at a BS that facilitates handling of DL control and data channels having different numerologies, according to various aspects discussed herein. In other aspects, a machine readable medium can store instructions associated with method 1400 that, when executed, can cause a BS (e.g., eNB, gNB, etc.) to perform the acts of method 1400.

At 1410, UE capability information can be received that indicates whether the UE supports FDM-based multiplexing of multiple numerologies in a single symbol.

At 1420, higher layer signaling can be transmitted that configures one or more control resource sets with the same or different numerologies based on the UE capability information.

Additionally or alternatively, method 1400 can include one or more other acts described herein in connection with transmitting entity aspects of system 500.

A first example embodiment employable in connection with aspects discussed herein can comprise a system and/or method of wireless communication for a fifth generation (5G) or new radio (NR) system: reporting a UE capability information (e.g., via a message generated by processor(s) 410, transmitted by transceiver circuitry 420, received by communication circuitry 520, and processed by processor(s) 510), wherein the UE capability information report contains information indicating whether the UE supports multiplexing of multiple numerologies in a frequency division multiplexing (FDM) manner in the same symbol; configuring (e.g., via processor(s) 510), by a NR NodeB (gNB), two or more control resource sets using same or different numerologies based at least in part on the UE capability information; and transmitting (e.g., via communication circuitry 520) a downlink data channel (e.g., NR PDSCH, generated by processor(s) 510) using a resource which is not used for transmission (e.g., via communication circuitry 520) of the DL control channel (e.g., NR PDCCH, generated by processor(s) 510).

In various aspects, the first example embodiment can further comprise generating (e.g., via processor(s) 410) a UE CAPABILITY INFORMATION message and transmitting it to a BS (e.g., via transmission by transceiver circuitry 420 and reception by communication circuitry 520), wherein the UE CAPABILITY INFORMATION message can comprise at least one field indicating whether UE supports multiplexing of multiple numerologies in a frequency division multiplexing (FDM) manner in the same symbol.

In various aspects of the first example embodiment, wherein the UE does not support FDM-based multiplexing of multiple numerologies in the same symbol, the BS can configure (e.g., via higher layer signaling generated by processor(s) 510, transmitted via communication circuitry 520, received via transceiver circuitry 420, and processed by processor(s) 410) a same numerology for multiple control resource sets.

In various aspects of the first example embodiment, wherein the UE does not support FDM-based multiplexing of multiple numerologies in the same symbol, the BS (e.g., gNB) can configure multiple control resource sets with different numerologies in a time division multiplexing (TDM)-based manner in different symbols or slots (e.g., via higher layer signaling generated by processor(s) 510, transmitted via communication circuitry 520, received via transceiver circuitry 420, and processed by processor(s) 410).

In various aspects of the first example embodiment, wherein the UE does not support FDM-based multiplexing of multiple numerologies in the same symbol, and wherein the BS (e.g., gNB) configures multiple control resource sets with different numerologies in the same symbol or slot (e.g., via higher layer signaling generated by processor(s) 510, transmitted via communication circuitry 520, received via transceiver circuitry 420, and processed by processor(s) 410), certain priority rules and/or dropping rules can be defined and implemented (e.g., by processor(s) 410 and/or processor(s) 510) to allow the UE to skip decoding of PDCCH (e.g., via processor(s) 410) in one or more control resource sets associated with one numerology.

In various aspects of the first example embodiment, the value for the control resource size carried by the group common PDCCH can be aligned using a single numerology.

In various aspects of the first example embodiment, wherein the UE supports FDM-based multiplexing of different numerologies in the same symbol, a guard band can be inserted (e.g., by processor(s) 510 and communication circuitry 520) between the DL control (e.g., NR PDCCH) and data (e.g., NR PDSCH) transmission with different numerologies.

In various aspects of the first example embodiment, wherein the UE does not support FDM-based multiplexing of different numerologies in the same symbol, for cross-numerology scheduling, the same numerology can be employed (e.g., by processor(s) 510 and communication circuitry 520) for PDSCH as PDCCH in symbols where control resource set is configured in scenarios involving dynamic resource sharing of PDCCH and PDSCH.

In various aspects of the first example embodiment, wherein the control resource set size or the number of symbols for control resource size is indicated in the group common PDCCH (e.g., generated by processor(s) 510, transmitted via communication circuitry 520, received via transceiver circuitry 420, and processed by processor(s) 410), for dynamic resource sharing between control (e.g., PDCCH) and data (e.g., PDSCH) channels (e.g., generated by processor(s) 510, transmitted via communication circuitry 520, received via transceiver circuitry 420, and processed by processor(s) 410), the data channel (e.g., PDSCH) can be rate matched around or can puncture (e.g., via processor(s) 510 and/or communication circuitry 520) the resource from control resource set in accordance with the size which is indicated in the group common PDCCH (e.g., generated by processor(s) 510, transmitted via communication circuitry 520, received via transceiver circuitry 420, and processed by processor(s) 410).

In various aspects of the first example embodiment, wherein the UE can assume (e.g., via processor(s) 410) that the DL data (e.g., PDSCH) transmission can be rate matched around or can puncture the resource from control resource set in accordance with the control resource set size configured by higher layers (e.g., via higher layer signaling generated by processor(s) 510, transmitted via communication circuitry 520, received via transceiver circuitry 420, and processed by processor(s) 410). In various such aspects, additional parity bits from the channel encoder (e.g., generated by processor(s) 510) can be transmitted (e.g., by communication circuitry 520) within the resource not used for transmission (e.g., via communication circuitry 520) of the control channel (e.g., PDCCH generated by processor(s) 510), but configured for control resource set.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: generate a report comprising capability information associated with the UE, wherein the capability information indicates whether the UE supports multiplexing of multiple numerologies within a common symbol in a FDM (Frequency Division Multiplexing)-based manner; process first higher layer signaling that configures one or more control resource sets of a NR (New Radio) PDCCH (Physical Downlink Control Channel), wherein the one or more control resource sets are associated with one or more numerologies in accordance with the UE capability information; demodulate a NR PDSCH (Physical Downlink Shared Channel) from a resource distinct from resources of the NR PDCCH; and send the first higher layer signaling to a memory via the memory interface.

Example 2 comprises the subject matter of any variation of any of example(s) 1, wherein the report comprises a UE CAPABILITY INFORMATION message that indicates the capability information via at least one field of the UE CAPABILITY INFORMATION.

Example 3 comprises the subject matter of any variation of example(s) 1-2, wherein the UE does not support multiplexing of multiple numerologies within the common symbol in the FDM-based manner, and wherein the one or more control resource sets are associated with a common numerology.

Example 4 comprises the subject matter of any variation of example(s) 1-2, wherein the UE does not support multiplexing of multiple numerologies within the common symbol in the FDM-based manner, wherein the one or more control resource sets comprise two or more control resource sets associated with two or more numerologies, and wherein the two or more control resource sets are multiplexed in a TDM (Time Division Multiplexing)-based manner.

Example 5 comprises the subject matter of any variation of example(s) 1-2, wherein the UE does not support multiplexing of multiple numerologies within the common symbol in the FDM-based manner, wherein the one or more control resource sets comprise two or more control resource sets associated with two or more numerologies, wherein the two or more control resource sets are multiplexed in the FDM-based manner in one or more symbols, and wherein the processing circuitry is further configured to determine, based on a priority rule, a single control resource set to decode from the two or more control resource sets.

Example 6 comprises the subject matter of any variation of example(s) 1-2, wherein a value for a control resource set size of the one or more control resource sets is associated with a single numerology.

Example 7 comprises the subject matter of any variation of example(s) 1-2, wherein the UE does support multiplexing of multiple numerologies within the common symbol in the FDM-based manner, wherein the NR PDSCH has a distinct numerology from a first numerology of a first control resource set of the one or more control resource sets, wherein the NR PDSCH and the first control resource set are multiplexed in one or more symbols in the FDM-based manner, and wherein a guard band separates the NR PDSCH from the first control resource set.

Example 8 comprises the subject matter of any variation of example(s) 1-2, wherein the UE does not support multiplexing of multiple numerologies within the common symbol in the FDM-based manner, wherein the NR PDSCH, wherein the NR PDSCH and a second control resource set of the one or more control resource sets are multiplexed in the FDM-based manner in one or more symbols, and wherein the NR PDSCH and the second control resource set have a common numerology in the one or more symbols.

Example 9 comprises the subject matter of any variation of example(s) 1-2, wherein the processing circuitry is further configured to determine a size of a third control resource set of the one or more control resource sets based on a group common PDCCH of the NR PDCCH that indicates the size, and wherein the NR PDSCH is one of rate matched around or puncturing the third control resource set based on the size of the third control resource set indicated in the group common PDCCH.

Example 10 comprises the subject matter of any variation of example(s) 1-2, wherein the processing circuitry is further configured to determine that the NR PDSCH is one of rate matched around or puncturing a fourth control resource set based on a size of the fourth control resource set indicated via second higher layer signaling.

Example 11 comprises the subject matter of any variation of example(s) 10, wherein the size of the fourth control resource set indicated via the second higher layer signaling is associated with a given resource, wherein a first portion of the given resource is associated with the fourth control resource set, and wherein a distinct second portion of the given resource is associated with parity bits.

Example 12 is apparatus configured to be employed in a gNB (next generation Node B), comprising: a memory interface; and processing circuitry configured to: process a report comprising capability information associated with a UE (User Equipment), wherein the capability information indicates whether the UE supports multiplexing of multiple numerologies within a common symbol in a FDM (Frequency Division Multiplexing)-based manner; generate first higher layer signaling that configures one or more control resource sets of a NR (New Radio) PDCCH (Physical Downlink Control Channel), wherein the one or more control resource sets are associated with one or more numerologies in accordance with the UE capability information;

map a NR PDSCH (Physical Downlink Shared Channel) to a resource distinct from resources of the NR PDCCH; and send the capability information to a memory via the memory interface.

Example 13 comprises the subject matter of any variation of example(s) 12, wherein the report comprises a UE CAPABILITY INFORMATION message that indicates the capability information via at least one field of the UE CAPABILITY INFORMATION.

Example 14 comprises the subject matter of any variation of example(s) 12-13, wherein the capability information indicates the UE does not support multiplexing of multiple numerologies within the common symbol in the FDM-based manner, and wherein the one or more control resource sets comprise two or more control resource sets associated with a common numerology.

Example 15 comprises the subject matter of any variation of example(s) 12-13, wherein the capability information indicates the UE does not support multiplexing of multiple numerologies within the common symbol in the FDM-based manner, wherein the one or more control resource sets comprise two or more control resource sets associated with two or more numerologies, and wherein the processing circuitry is further configured to multiplex the two or more control resource sets in a TDM (Time Division Multiplexing)-based manner.

Example 16 comprises the subject matter of any variation of example(s) 12-13, wherein the capability information indicates the UE does not support multiplexing of multiple numerologies within the common symbol in the FDM-based manner, wherein the one or more control resource sets comprise two or more control resource sets associated with two or more numerologies, wherein each of the two or more control resource sets has an associated priority for decoding based on a priority rule, and wherein the processing circuitry is further configured to multiplex the two or more control resource sets in the FDM-based manner in one or more symbols.

Example 17 comprises the subject matter of any variation of example(s) 12-13, wherein a value for a control resource set size of the one or more control resource sets is associated with a single numerology.

Example 18 comprises the subject matter of any variation of example(s) 12-13, wherein the capability information indicates the UE does support multiplexing of multiple numerologies within the common symbol in the FDM-based manner, wherein the NR PDSCH has a distinct numerology from a first numerology of a first control resource set of the one or more control resource sets, wherein the processing circuitry is further configured to multiplex the NR PDSCH and the first control resource set in one or more symbols in the FDM-based manner, and wherein a guard band separates the NR PDSCH from the first control resource set.

Example 19 comprises the subject matter of any variation of example(s) 12-13, wherein the UE does not support multiplexing of multiple numerologies within the common symbol in the FDM-based manner, wherein the NR PDSCH, wherein the processing circuitry is further configured to multiplex the NR PDSCH and the second control resource set in one or more symbols in the FDM-based manner, and wherein the NR PDSCH and the second control resource set have a common numerology in the one or more symbols.

Example 20 comprises the subject matter of any variation of example(s) 12-13, wherein the processing circuitry is further configured to: generate a group common PDCCH that indicates a size of a third control resource set of the one or more control resource sets; and based on the size of the third control resource set indicated in the group common PDCCH, one of rate match around the NR PDSCH to the third control resource set or puncture the third control resource set with the NR PDSCH.

Example 21 comprises the subject matter of any variation of example(s) 12-13, wherein the processing circuitry is further configured to: generate second higher layer signaling configuring a size for a fourth control resource set of the one or more control resource sets; and based on the size of the third control resource set indicated in the group common PDCCH, one of rate match the NR PDSCH around the fourth control resource set or puncture the fourth control resource set with the NR PDSCH.

Example 22 comprises the subject matter of any variation of example(s) 21, wherein the size of the fourth control resource set indicated via the second higher layer signaling is associated with a given resource, wherein the processing circuitry is further configured to: map the fourth control resource set to a first portion of the given resource; and map parity bits to a distinct second portion of the given resource.

Example 23 is a machine readable medium comprising instructions that, when executed, cause a UE (User Equipment) to: transmit a report comprising capability information that indicates whether the UE supports multiplexing of multiple numerologies within a common symbol in a FDM (Frequency Division Multiplexing)-based manner; receive first higher layer signaling configuring one or more control resource sets of a NR (New Radio) PDCCH (Physical Downlink Control Channel), wherein the one or more control resource sets are associated with one or more numerologies in accordance with the UE capability information; receive the one or more control resource sets; and receive a NR PDSCH (Physical Downlink Shared Channel) from a resource distinct from resources of the NR PDCCH.

Example 24 comprises the subject matter of any variation of example(s) 23, wherein the UE does not support multiplexing of multiple numerologies within a common symbol in a FDM (Frequency Division Multiplexing)-based manner, wherein the one or more control resource sets comprises a first control resource set with a first numerology and a second control resource set with a distinct second numerology, and wherein the first control resource set and the second control resource set are multiplexed in a TDM (Time Division Duplexing)-based manner.

Example 25 comprises the subject matter of any variation of example(s) 23, wherein the UE does not support multiplexing of multiple numerologies within a common symbol in a FDM (Frequency Division Multiplexing)-based manner, wherein the one or more control resource sets comprises a third control resource set with a third numerology and a fourth control resource set with the third numerology, wherein the third control resource set and the fourth control resource set are multiplexed in a FDM-based manner in one or more symbols, and wherein the instructions, when executed, further cause the UE to: select, based on a priority rule, a selected control resource set from the fifth control resource set and the sixth control resource set; and decode only the selected control resource set from the fifth control resource set and the sixth control resource set.

Example 26 comprises the subject matter of any variation of example(s) 23, wherein the UE does not support multiplexing of multiple numerologies within a common symbol in a FDM (Frequency Division Multiplexing)-based manner, wherein the one or more control resource sets comprises a fifth control resource set with a fifth numerology and a sixth control resource set with the fifth numerology, wherein the fifth control resource set and the sixth control resource set are multiplexed in a FDM-based manner in one or more symbols.

Example 27 is a machine readable medium comprising instructions that, when executed, cause a gNB (next generation Node B) to: receive a report comprising capability information associated with a UE (User Equipment), wherein the capability information indicates whether the UE supports multiplexing of multiple numerologies within a common symbol in a FDM (Frequency Division Multiplexing)-based manner; transmit first higher layer signaling that configures one or more control resource sets of a NR (New Radio) PDCCH (Physical Downlink Control Channel), wherein the one or more control resource sets are associated with one or more numerologies in accordance with the UE capability information; and transmit a NR PDSCH (Physical Downlink Shared Channel) to a resource distinct from resources of the NR PDCCH.

Example 28 comprises the subject matter of any variation of example(s) 27, wherein the instructions, when executed, further cause the gNB to generate second higher layer signaling that indicates a priority rule for selecting a control resource set for decoding from the one or more control resource sets.

Example 29 comprises the subject matter of any variation of example(s) 27, wherein the instructions, when executed, further cause the gNB to: generate third higher layer signaling that indicate a size of a resource associated with a first control resource set; and when the first control resource set occupies only a portion of the resource associated with the first control resource set, fill the remainder of the resource associated with the first control resource set with parity bits.

Example 30 comprises the subject matter of any variation of example(s) 28, wherein the UE does not support multiplexing of multiple numerologies within a common symbol in a FDM (Frequency Division Multiplexing)-based manner, wherein the one or more control resource sets comprises at least two control resource sets with different numerologies, and wherein the instructions, when executed, further cause the gNB to multiplex the at least two control resource sets with different numerologies in a TDM (Time Division Duplexing)-based manner.

Example 31 comprises an apparatus comprising means for executing any of the described operations of examples 1-30.

Example 32 comprises a machine readable medium that stores instructions for execution by a processor to perform any of the described operations of examples 1-30.

Example 33 comprises an apparatus comprising: a memory interface; and processing circuitry configured to: perform any of the described operations of examples 1-30.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
generate a report comprising capability information associated with the UE, wherein the capability information indicates whether the UE supports multiplexing of multiple numerologies within a common symbol in a FDM (Frequency Division Multiplexing)-based manner;
process first higher layer signaling that configures one or more control resource sets of a NR (Previously Presented Radio) PDCCH (Physical Downlink Control Channel), wherein the one or more control resource sets are associated with one or more numerologies in accordance with the UE capability information; and
demodulate a NR PDSCH (Physical Downlink Shared Channel) from a resource distinct from resources of the NR PDCCH.

2. The apparatus of claim 1, wherein the report comprises a UE CAPABILITY INFORMATION message that indicates the capability information via at least one field of the UE CAPABILITY INFORMATION.

3. The apparatus of claim 1, wherein the UE does not support multiplexing of multiple numerologies within the common symbol in the FDM-based manner, and wherein the one or more control resource sets are associated with a common numerology.

4. The apparatus of claim 1, wherein the UE does not support multiplexing of multiple numerologies within the common symbol in the FDM-based manner, wherein the one or more control resource sets comprise two or more control resource sets associated with two or more numerologies, and wherein the two or more control resource sets are multiplexed in a TDM (Time Division Multiplexing)-based manner.

5. The apparatus of claim 1, wherein the UE does not support multiplexing of multiple numerologies within the common symbol in the FDM-based manner, wherein the one or more control resource sets comprise two or more control resource sets associated with two or more numerologies, wherein the two or more control resource sets are multiplexed in the FDM-based manner in one or more symbols, and wherein the processing circuitry is further configured to determine, based on a priority rule, a single control resource set to decode from the two or more control resource sets.

6. The apparatus of claim 1, wherein a value for a control resource set size of the one or more control resource sets is associated with a single numerology.

7. The apparatus of claim 1, wherein the UE does support multiplexing of multiple numerologies within the common symbol in the FDM-based manner, wherein the NR PDSCH has a distinct numerology from a first numerology of a first control resource set of the one or more control resource sets, wherein the NR PDSCH and the first control resource set are multiplexed in one or more symbols in the FDM-based manner, and wherein a guard band separates the NR PDSCH from the first control resource set.

8. The apparatus of claim 1, wherein the UE does not support multiplexing of multiple numerologies within the common symbol in the FDM-based manner, wherein the NR PDSCH, wherein the NR PDSCH and a second control resource set of the one or more control resource sets are multiplexed in the FDM-based manner in one or more symbols, and wherein the NR PDSCH and the second control resource set have a common numerology in the one or more symbols.

9. The apparatus of claim 1, wherein the processing circuitry is further configured to determine a size of a third control resource set of the one or more control resource sets based on a group common PDCCH of the NR PDCCH that indicates the size, and wherein the NR PDSCH is one of rate matched around or puncturing the third control resource set based on the size of the third control resource set indicated in the group common PDCCH.

10. The apparatus of claim 1, wherein the processing circuitry is further configured to determine that the NR PDSCH is one of rate matched around or puncturing a fourth control resource set based on a size of the fourth control resource set indicated via second higher layer signaling.

11. The apparatus of claim 10, wherein the size of the fourth control resource set indicated via the second higher layer signaling is associated with a given resource, wherein a first portion of the given resource is associated with the fourth control resource set, and wherein a distinct second portion of the given resource is associated with parity bits.

12. The apparatus of claim 1, wherein the resources of the NR PDCCH and the resource distinct from the resources of the NR PDCCH are in different component carriers.

13. An apparatus configured to be employed in a gNB (next generation Node B), comprising:
a memory interface; and
processing circuitry configured to:
process a report comprising capability information associated with a UE (User Equipment), wherein the capability information indicates whether the UE supports multiplexing of multiple numerologies within a common symbol in a FDM (Frequency Division Multiplexing)-based manner;
generate first higher layer signaling that configures one or more control resource sets of a NR (Previously Presented Radio) PDCCH (Physical Downlink Control Channel), wherein the one or more control resource sets are associated with one or more numerologies in accordance with the UE capability information; and
map a NR PDSCH (Physical Downlink Shared Channel) to a resource distinct from resources of the NR PDCCH.

14. The apparatus of claim 13, wherein the report comprises a UE CAPABILITY INFORMATION message that indicates the capability information via at least one field of the UE CAPABILITY INFORMATION.

15. The apparatus of claim 13, wherein the capability information indicates the UE does not support multiplexing of multiple numerologies within the common symbol in the FDM-based manner, and wherein the one or more control resource sets comprise two or more control resource sets associated with a common numerology.

16. The apparatus of claim 13, wherein the capability information indicates the UE does not support multiplexing of multiple numerologies within the common symbol in the FDM-based manner, wherein the one or more control resource sets comprise two or more control resource sets associated with two or more numerologies, and wherein the processing circuitry is further configured to multiplex the two or more control resource sets in a TDM (Time Division Multiplexing)-based manner.

17. The apparatus of claim 13, wherein the capability information indicates the UE does not support multiplexing of multiple numerologies within the common symbol in the FDM-based manner, wherein the one or more control resource sets comprise two or more control resource sets associated with two or more numerologies, wherein each of the two or more control resource sets has an associated priority for decoding based on a priority rule, and wherein the processing circuitry is further configured to multiplex the two or more control resource sets in the FDM-based manner in one or more symbols.

18. The apparatus of claim 13, wherein a value for a control resource set size of the one or more control resource sets is associated with a single numerology.

19. The apparatus of claim 13, wherein the capability information indicates the UE does support multiplexing of multiple numerologies within the common symbol in the FDM-based manner, wherein the NR PDSCH has a distinct numerology from a first numerology of a first control resource set of the one or more control resource sets, wherein the processing circuitry is further configured to multiplex the NR PDSCH and the first control resource set in one or more symbols in the FDM-based manner, and wherein a guard band separates the NR PDSCH from the first control resource set.

20. The apparatus of claim 13, wherein the UE does not support multiplexing of multiple numerologies within the common symbol in the FDM-based manner, wherein the NR PDSCH, wherein the processing circuitry is further configured to multiplex the NR PDSCH and the second control resource set in one or more symbols in the FDM-based manner, and wherein the NR PDSCH and the second control resource set have a common numerology in the one or more symbols.

21. The apparatus of claim 13, wherein the processing circuitry is further configured to:
generate a group common PDCCH that indicates a size of a third control resource set of the one or more control resource sets; and
based on the size of the third control resource set indicated in the group common PDCCH, one of rate match around the NR PDSCH to the third control resource set or puncture the third control resource set with the NR PDSCH.

22. The apparatus of claim 13, wherein the processing circuitry is further configured to:
generate second higher layer signaling configuring a size for a fourth control resource set of the one or more control resource sets; and
based on the size of the third control resource set indicated in the group common PDCCH, one of rate match the NR PDSCH around the fourth control resource set or puncture the fourth control resource set with the NR PDSCH.

23. The apparatus of claim 22, wherein the size of the fourth control resource set indicated via the second higher layer signaling is associated with a given resource, wherein the processing circuitry is further configured to:
  map the fourth control resource set to a first portion of the given resource; and map parity bits to a distinct second portion of the given resource.

24. The apparatus of claim 13, wherein the resources of the NR PDCCH and the resource distinct from the resources of the NR PDCCH are in different component carriers.

25. A non-transitory machine readable medium comprising instructions that, when executed, cause a UE (User Equipment) to:
  transmit a report comprising capability information that indicates whether the UE supports multiplexing of multiple numerologies within a common symbol in a FDM (Frequency Division Multiplexing)-based manner;
  receive first higher layer signaling configuring one or more control resource sets of a NR (Previously Presented Radio) PDCCH (Physical Downlink Control Channel), wherein the one or more control resource sets are associated with one or more numerologies in accordance with the UE capability information;
  receive the one or more control resource sets; and
  receive a NR PDSCH (Physical Downlink Shared Channel) from a resource distinct from resources of the NR PDCCH.

26. The non-transitory machine readable medium of claim 25, wherein the UE does not support multiplexing of multiple numerologies within a common symbol in a FDM (Frequency Division Multiplexing)-based manner, wherein the one or more control resource sets comprises a first control resource set with a first numerology and a second control resource set with a distinct second numerology, and wherein the first control resource set and the second control resource set are multiplexed in a TDM (Time Division Duplexing)-based manner.

27. The non-transitory machine readable medium of claim 25, wherein the UE does not support multiplexing of multiple numerologies within a common symbol in a FDM (Frequency Division Multiplexing)-based manner, wherein the one or more control resource sets comprises a third control resource set with a third numerology and a fourth control resource set with the third numerology, wherein the third control resource set and the fourth control resource set are multiplexed in a FDM-based manner in one or more symbols, and wherein the instructions, when executed, further cause the UE to:
  select, based on a priority rule, a selected control resource set from the fifth control resource set and the sixth control resource set; and
  decode only the selected control resource set from the fifth control resource set and the sixth control resource set.

28. The non-transitory machine readable medium of claim 25, wherein the UE does not support multiplexing of multiple numerologies within a common symbol in a FDM (Frequency Division Multiplexing)-based manner, wherein the one or more control resource sets comprises a fifth control resource set with a fifth numerology and a sixth control resource set with the fifth numerology, wherein the fifth control resource set and the sixth control resource set are multiplexed in a FDM-based manner in one or more symbols.

29. The of claim 25, wherein the resources of the NR PDCCH and the resource distinct from the resources of the NR PDCCH are in different component carriers.

30. A non-transitory machine readable medium comprising instructions that, when executed, cause a gNB (next generation Node B) to:
  receive a report comprising capability information associated with a UE (User Equipment), wherein the capability information indicates whether the UE supports multiplexing of multiple numerologies within a common symbol in a FDM (Frequency Division Multiplexing)-based manner;
  transmit first higher layer signaling that configures one or more control resource sets of a NR (Previously Presented Radio) PDCCH (Physical Downlink Control Channel), wherein the one or more control resource sets are associated with one or more numerologies in accordance with the UE capability information; and
  transmit a NR PDSCH (Physical Downlink Shared Channel) to a resource distinct from resources of the NR PDCCH.

31. The non-transitory machine readable medium of claim 30, wherein the instructions, when executed, further cause the gNB to generate second higher layer signaling that indicates a priority rule for selecting a control resource set for decoding from the one or more control resource sets.

32. The non-transitory machine readable medium of claim 30, wherein the instructions, when executed, further cause the gNB to:
  generate third higher layer signaling that indicate a size of a resource associated with a first control resource set; and
  when the first control resource set occupies only a portion of the resource associated with the first control resource set, fill the remainder of the resource associated with the first control resource set with parity bits.

33. The non-transitory machine readable medium of claim 31, wherein the UE does not support multiplexing of multiple numerologies within a common symbol in a FDM (Frequency Division Multiplexing)-based manner, wherein the one or more control resource sets comprises at least two control resource sets with different numerologies, and wherein the instructions, when executed, further cause the gNB to multiplex the at least two control resource sets with different numerologies in a TDM (Time Division Duplexing)-based manner.

34. The method of claim 30, wherein the resources of the NR PDCCH and the resource distinct from the resources of the NR PDCCH are in different component carriers.

* * * * *

UNITED STATES PATENT AND TRADEMARK OFFICE
CERTIFICATE OF CORRECTION

PATENT NO. : 11,006,425 B2
APPLICATION NO. : 16/476127
DATED : May 11, 2021
INVENTOR(S) : Gang Xiong et al.

Page 1 of 2

It is certified that error appears in the above-identified patent and that said Letters Patent is hereby corrected as shown below:

In the Claims

Column 26, Lines 32-33 (Claim 1): the text "(Previously Presented Radio)" should read --(New Radio)--

Column 26, Lines 36 (Claim 1): Remove the text: --UE--

Column 27, Lines 55-56 (Claim 13): the text "(Previously Presented Radio)" should read --(New Radio)--

Column 27, Lines 59 (Claim 13): Remove the text: --UE--

Column 28, Lines 46 (Claim 20): the text "NR PDSCH and the second control" should read --NR PDSCH and the a second control--

Column 28, Lines 61 (Claim 22): the text "claim 13" should read --claim 21--

Column 29, Lines 24-25 (Claim 25): the text "(Previously Presented Radio)" should read --(New Radio)--

Column 29, Lines 28 (Claim 25): Remove the text: --UE--

Column 29, Lines 54-56 (Claim 27): the text "select, based on a priority rule, a selected control resource set from the fifth control resource set and the sixth control resource set" should read --select, based on a priority rule, a selected control resource set from a fifth control resource set and a sixth control resource set--

Column 30, Line 11 (Claim 29): the text "The of claim 25" should read --The non-transitory machine readable medium of claim 25--

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,006,425 B2

Column 30, Lines 23-24 (Claim 30): the text "(Previously Presented Radio)" should read --(New Radio)--

Column 30, Line 27 (Claim 30): Remove the text: --UE--

Column 30, Line 44 (Claim 32): the text "fill the remainder" should read --fill a remainder--

Column 30, Line 56 (Claim 34): the text "The method of claim 30" should read --The non-transitory machine readable medium of claim 30--